(12) United States Patent
Guckenberger

(10) Patent No.: US 8,208,764 B2
(45) Date of Patent: Jun. 26, 2012

(54) PHOTO AUTOMATIC LINKING SYSTEM AND METHOD FOR ACCESSING, LINKING, AND VISUALIZING "KEY-FACE" AND/OR MULTIPLE SIMILAR FACIAL IMAGES ALONG WITH ASSOCIATED ELECTRONIC DATA VIA A FACIAL IMAGE RECOGNITION SEARCH ENGINE

(76) Inventor: Elizabeth Guckenberger, Montverde, FL (US)

( * ) Notice: Subject to any disclaimer, the term of this patent is extended or adjusted under 35 U.S.C. 154(b) by 895 days.

(21) Appl. No.: 11/625,181

(22) Filed: Jan. 19, 2007

(65) Prior Publication Data

US 2007/0172155 A1 Jul. 26, 2007

Related U.S. Application Data

(60) Provisional application No. 60/760,573, filed on Jan. 21, 2006.

(51) Int. Cl.
G06K 9/54 (2006.01)
(52) U.S. Cl. ........ 382/305; 345/156; 345/422; 382/115; 382/159; 382/218; 382/306; 715/757
(58) Field of Classification Search ........................ None
See application file for complete search history.

(56) References Cited

U.S. PATENT DOCUMENTS

| | | | | |
|---|---|---|---|---|
| 5,027,292 A | * | 6/1991 | Rossignac et al. | 345/422 |
| 5,802,361 A | * | 9/1998 | Wang et al. | 395/600 |
| 6,332,139 B1 | * | 12/2001 | Kaneko et al. | 1/1 |
| 6,574,378 B1 | * | 6/2003 | Lim | 382/305 |
| 6,803,928 B2 | * | 10/2004 | Bimber et al. | 715/757 |
| 2001/0026631 A1 | * | 10/2001 | Slocum et al. | 382/115 |
| 2003/0085866 A1 | * | 5/2003 | Bimber et al. | 345/156 |
| 2004/0247177 A1 | * | 12/2004 | Rowe et al. | 382/159 |
| 2005/0117816 A1 | * | 6/2005 | Saeger et al. | 382/305 |
| 2005/0169535 A1 | * | 8/2005 | Stentiford | 382/218 |
| 2008/0279481 A1 | * | 11/2008 | Ando | 382/306 |
| 2009/0157660 A1 | * | 6/2009 | Jung et al. | 707/5 |

* cited by examiner

*Primary Examiner* — Anand Bhatnagar
*Assistant Examiner* — Tsung-Yin Tsai
(74) *Attorney, Agent, or Firm* — Beusse Wolter Sanks Mora & Maire, P.A.; Terry M. Sanks

(57) ABSTRACT

A system for accessing multiple similar key-face images and associated electronic data by providing an image containing a face, the system including a means for capturing an image containing a face, a means for transmitting said image to a facial image recognition search engine. The engine includes a means to receive said image, a means of extracting a facial image from the captured image, a web crawler or spider configured to seek "best-fit" matching facial images disposed on the internet, a means to access said facial image's "best-fit" matching facial images and associated electronic data with each "best-fit" image, a means to transmit said "best-fit" matching facial images and associated data to a display unit, and a mirror imaging device configured to superimpose at least one "best-fit" image on an other facial image, wherein at least one of the images is semi-transparent such that both can be seen superimposed simultaneously.

24 Claims, 21 Drawing Sheets

PHOTO AUTOMATIC LINKING SYSTEM AND METHOD FOR ACCESSING, LINKING, AND VISUALIZING "KEY-FACE" AND/OR MULTIPLE SIMILAR FACIAL IMAGES ALONG WITH ASSOCIATED ELECTRONIC DATA VIA A FACIAL IMAGE RECOGNITION SEARCH ENGINE

CROSS-REFERENCE TO RELATED APPLICATIONS

Applicant claims the benefit of Provisional Patent Application Ser. No. 60/760,573 Filed Jan. 21, 2006

FIELD OF INVENTION

The invention relates to the field of facial image recognition search engines and retrieval of "best-fit" matching for "key-face" and/or multiple similar facial images with electronic information related to each facial image for innovative new on-line commercialization, medical, training, and information technology uses.

BACKGROUND OF THE INVENTION

The Internet began as a distributed database of limited textual information, and quickly transformed into an extensive database of video, images, text, audio, data and encrypted information. The varieties of information continue to expand and our current use of text based search engines severely limits the effectiveness, and efficiency of our Internet searches. It would take several lifetimes to hunt for various kinds of information throughout the Internet and USENET news groups, and, all the while, the number of files would be expanding faster than anyone's ability to pursue them.

Search engines were devised to manage the hunt. Search engines are programs that search the Internet for documents that contain specified keywords and return a list of documents which contain those keywords. These engines run programs called "web-crawlers" or "spiders" that continuously explore the Internet and, often, USENET news groups, they index the information on websites that the web-crawlers or spiders encounter. Indexing forms a vast database of website addresses that are associated with key words that have been found on the websites themselves.

Search engines such as Yahoo, Google, MSN, and International Business Machines' CLEVER require the user to enter at least one key term or query into a text field. Keywords, phrases, phrases in quotes, and Boolean queries are matched to various sites on the Internet, and when the query is complete a list of these sites is displayed for the user's review with convenient hyper-links.

Although the most widely used search engines have a category that enables them to access images, none of them allows an image to be entered as a query or search entity. All known engines require that the user enter a text query, and the search hits files that display images that are associated with the entered text query. If a person sees an image and wishes to access online information about it, he or she will have to search for it using a text query. The user cannot use the image itself as a query. If the user cannot put his or her search request into words, he or she will not be able to conduct a search in a standard online search engine.

Several innovators are working to solve this need. Hewlett-Packard, for example, has developed a method of indexing an image that is based on information derived from a global positioning system (GPS). The system obtains an image along with its location, and indexes images according to their location. Such systems are useful in organizing album data since some digital cameras can acquire GPS data and correlate it with captured imagery. However, searching is limited to images that have a significant correlation with a given location.

A search engine developed by Xerox Corporation incorporates a multi-modal browsing and clustering system to retrieve image data. The system seeks similarities between images not only in textual references, but also in other associated information such as in-links, out-links, image characteristics, text genre, and the like. However, this engine is limited to specific image types which have defined colors, contain text, and have other visual identifiers. In short, the Xerox engine requires the images to have such specific characteristics, it limits the system's utility and viability as an all purpose search engine.

Some attempts have been made to extract information from databases using images themselves as search entities rather than keywords related to the images. These systems can translate, provide information about, or interpret objects contained in an image. These systems generally work as follows. An input device extracts the object of interest from its background. The object is compared with objects stored in a pre-populated database to find a match. Finally, the system retrieves information in the database about the object and permits it to be displayed to the user. However, the system is limited to images containing extractable, defined objects, such as fruits, articles, animals, or any object which is easily outlined. However many images require identification as a whole entity, such as an image of a geographic locations or a piece of artwork. As a result, this method has limited applicability.

Complex images with a myriad of superfluous objects are easier to identify using methods such as pixel analysis. Using this method, a database is populated with primitive, weighted vectors of images that facilitate the image processing. The inputted images are compared and matched through specific vectors that define them. Therefore, there remains a clear need for a system capable of capturing images, converting those images into computer readable formats, using the processed images as search queries in a search engine, comparing the images to images stored in the database, and, upon finding a match, displaying information associated with the image to a user of the system.

So far attempts to develop and solve such a general method for accessing electronic data via an image search engine have been fraught with multiple types and levels of problems. Overcoming long standing image matching problems is very challenging in the face of different capture angles, different orientations, different perspectives, different zoom factors, lens differences, differences in lighting sources (point and ambient), difference in shadowing, differences in time of day, differences in time of year, differences in Earth surface locations of image capture different atmospheric conditions, differences in capture pixel resolution and differences in encoding schema, etc. Further, classification and encoding of the images within databases is itself very problematic with context and content definitions being extremely difficult to standardize upon.

Many companies and individuals are working diligently to solve the hard problems associated with general image searching including such giants as Google and Microsoft. Incremental progress to date points to a long difficult development cycle to solve the general image search problems.

While others continue to struggle trying to solve the general image search problem, viable niche image search solutions have been ignored. This lack of viable niche image search solutions within the prior art is clearly demonstrated by their lack of popular use within the current multibillion-dollar Internet Search Engines.

Automated Facial Image Linking to Endorsements, Marketing, Advertising, and/or Points-of-Sale for Related Products and Services Additional lacks within the prior art are utilization and exploitation of highly developed Human capacities to recognize Human faces and related affective emotions associated with those faces. Darwinian Natural Selection of Humans who are social animals have over the history of mankind directly selected for such highly developed facial recognition skills within successful Human descendents alive today. To a limited extent the advertising community has succeeded in utilizing our celebrity driven popular culture to relate celebrity faces to positive emotions that affectively aid in selling celebrity related products and services. Typically, the advertising community manually works piecemeal with signed celebrities to produce stove-pipe ad campaigns whose effectiveness can only be grossly estimated as a ratio of increased sales to the costs of the celebrity advertising. Specifically, lacking in the prior art are:

1. An automated convenient method for linking celebrity facial images to all their related endorsements, marketing, advertising, and points-of-sale of products and services;
2. Automated convenient methods for linking any model's, actor's, or any person's facial images to their related endorsements, marketing, advertising, and points-of-sale of products and services;
3. Automated convenient methods of tracking accessing of celebrities' information by consumers or users, to accessing endorsements, marketing, advertising, and/or points-of-sale for celebrity related products and services;
4. Reverse methods of tracking products, services and even points of sale (stores, brands, on-line web sites, etc) of interest to the celebrities that endorse, market, and/or advertise them.

Automated Facial Image Linking for Emotional and Health Monitoring and Diagnose.

Darwinian Natural Selection of Humans has also highly developed the capacity to judge other Human individuals health and emotions based upon the individuals face. Specifically, facial skin coloring, dark circles under the eyes, redness of eyes, lips, cheeks, ears, etc all give clues to the relative health of an individual Human. Doctors and medical staff routinely note differences in an individual's facial characteristic as a key component of monitoring and diagnosing their patients. Unfortunately, the current status quo requires the doctors and medical staff to physically walk rounds to view patients on a periodic basis with the heavy burden and workload of memory and comparison from prior visits being required within the brain of all concerned medical staff and doctors. Such manual methods are slow, lack consistency and reliability, and are error prone. Specifically lacking are automated methods to conveniently periodically image capture patients facial images so that doctors and medical staff can view the time lapse facial images to judge progress of patients, and/or aid in diagnoses. Further lacking in the prior art are the use of automated means to read and record the universal emotions from patients' faces utilizing the Facial Action Coding System. A patient's morale and emotional state are so important to their recovery, yet no automated means is utilized to judge the patients in such a manner.

Automated Real-Time Semi-Transparent Superimposed Facial Expression Mimicry

Darwinian Natural Selection of Humans has also highly developed the capacity to mimic the actions of other Human individuals. The mere act of watching another Human performing a task activates Mirror Neurons within the watching Human that correspond to the same areas of the nervous system as the human actually performing the task. These innate mimic abilities seem to work over a wide range of viewing angles and distances. Facial expression mimicry is a specially developed ability in social Humans. However, the prior art is lacking in the use of real-time semi-transparent superimposing of a person face wishing to mimic the facial expression of another Human.

Key-Face indexing and retrieval of Internet, USENET, and other resources, analogous to the current textural key-word indexing and retrieval of same is currently lacking.

As highlighted in the prior paragraphs multiple unobvious commercially viable niche facial image recognition search engine solutions to the general image search engine problem have not been discovered nor implemented in the prior art.

SUMMARY OF THE INVENTION

The invention relates to the field of facial image recognition search engines and retrieval of "best-fit" matching for "key-face" and/or multiple similar facial images with electronic information related to each facial image for innovative new on-line commercialization, medical, training, and information technology uses. The present invention provides a system and method for input of images containing faces for accessing, linking, and or visualizing multiple "key-face" and/or multiple similar facial images along with associated electronic data for these new uses. The system uses various image capturing devices and/or communication devices to capture images containing faces and enter them into a facial image recognition search engine. Embedded facial image recognition techniques within the image recognition search engine extract facial images and encode the extracted facial images in a computer readable format. The processed facial images are then entered for comparison into at least one database populated with facial images and associated information. Once the newly captured facial images are matched with similar "best-fit match" facial images in the facial image recognition search engine's database, the "best-fit" matching images and each image's associated information is returned to the user. Additionally, the newly captured facial image can be intuitively automatically linked to the "best-fit" matching or similar facial images, for enhanced and improved organization, classification, and fast sorts and retrieval objects and advantages for future classification groupings, along with comparisons calculated, and/or visualized.

Key new use innovations of the system include but are not limited to: input of user selected facial images for: the new use of finding multiple similar celebrity look-a-likes, with automatic linking that return the look-a-like celebrities' similar images, along with associated electronic information, and convenient opportunities to purchase fashion, jewelry, products and services to better mimic your celebrity look-a-likes; for new uses of direct access to celebrity driven marketing for example, by using Brad Pitt facial image capture from one of his movies as input to the system, the system would return his "key-face" image with all the products he is currently endorsing along with convenient links to purchase said products; entirely new classes of semi-transparent facial images that superimposes with the user's face to mimic other similar faces, such as mimic their celebrity look-a-like cosmetic make-up applications, and mimicking celebrity facial expressions; for new uses in health monitoring and diagnostic use by conveniently organizing and superimposing periodically captured patient facial images for health professionals to view time lapse progress of patients.

BACKGROUND OF INVENTION

Objects and Advantages

Accordingly, several objects and advantages of the invention are:

One object of the invention is the creation of a system which utilizes entry of an image containing faces as a search query or entity into a facial image recognition search engine and associated facial database to return "best-fit" matched similar facial images and related information for innovative new on-line commercialization, medical, training and information technology uses.

Another object of the invention is the creation of a system which utilizes a person's facial image as a "key-face" to electronic information searches and useful organization of the returned information. Beyond the current Internet key word searches which return a list of links, the new use of a "key-face" facial image search returns organized formatted information to enable users to conveniently view the "key-face" facial and/or additional similar images along with convenient buying of related products and services, as well as convenient links. For example using Brad Pitt's facial image capture from one of his movies as input to the system would return his "key-face" image with all the products and services he is currently endorsing along with convenient links to purchase said products and services. This object supports a myriad of innovative new business models, where a celebrity's face itself acts as the key index for searching for all things related to that celebrity. Instead of advertisers paying Google for list ranking position for key words, the invention enables advertisers paying the celebrity or invention owners for list ranking position for "key-face" searches. Further businesses can pay invention owners "per click on 'key-face' images", or commissions on "key-face" driven purchases, etc. The new object of "key-face" searches can be used as a more intuitive, easier-to-use substitute for key word searches. Or alternately, "key-face" searches and key word searches can be used in conjunction to enhance each other, and/or optimize results. Popular culture is driven by celebrities inclusive of celebrity images based upon their facial images which are among the most often searched for categories on the Internet and elsewhere, our invention exploits both of these overwhelming trends for commercial and convenience benefits. Advertisers promote and sell products and services through celebrities and their images, which in part drives popular culture. So the invention's use of celebrity images as "key-faces" instead of, or in addition to key word searches enables entirely new business models and more efficient and effective searching, retrieval and purchasing for celebrity and popular culture driven products and services. Since the bulk of purchases are celebrity endorsed or advertised products and services, the invention innovatively utilizes celebrity images as "key-face" search terms to enable more natural searching by Humans which are Darwinian Natural Selected as facial recognition driven social animals. These innovative combined uses of facial image recognition search engines with selected "key-face" facial databases to link celebrities facial images enables automated retrieval and organization of celebrity associated information, merchandising, endorsements, advertising, and/or convenient point-of-sale links.

Another object of the invention is the creation of a comprehensive registry of "key-face" facial images such as celebrity faces, derived from such sources as photographs, drawings, video clips, and holograms, which are associated with electronic data and serve as a universal facial image database that is available for matching facial images entered as search queries. Smaller specialized databases such as all living celebrities, all persons appearing in Revlon advertisements, sports legends from the 1920's, etc., and distributed databases which link multiple databases are also objects of the invention. The preferred embodiment of the invention is to actually utilize smaller, well defined facial image databases, such as the set of all living celebrities. These small well defined facial image databases tend to be more practical and economical to manage, along with superior niche profitability.

Another object of the invention is to have the facial image recognition search engine actually crawl the web and search for faces on every page and provide indexes and links based upon such facial images. This object enables the entire (or web crawled and searched areas) Web to become the universal facial image database.

Another object of the invention is to provide the user of the system with the capacity to add information and links pertaining to a facial image to the database. The adding of information and links can fulfill a wide range of uses beyond commercialization and advertising, from personal annotations, to massive collaborative ranking efforts of celebrities by millions of social network users.

Another object of the invention is the creation of a system which utilizes facial image recognition search engines as a means of comparing facial images entered as queries with facial images in the database in order to find "key-face" best-fit matches. Using Bill O'Reilly's facial image capture from one of his news broadcasts as input to the system would return his "key-face" image with all the books and products he is currently endorsing along with convenient links to purchase said products.

A further object of the invention is the creation of a system which enables innovative facial image recognition techniques then find multiple similar "key-faces" along with related information in the facial database and return the "key-faces" and related information to the user for a variety of innovative new uses, such as users finding celebrity look-a-likes, along with products and services to aid mimicking and increasing their resemblance to their celebrity look-a-likes. This is counter to the teachings of the prior art where the bulk of the facial image recognition search engines have focused on finding an exact match or returning a single best-fit image. The prior art seems to have neglected and ignored the potential myriad new uses for inputting images containing faces to purposefully search for and returning multiple similar images with associated electronic information. Specifically, user input of friends faces to return the celebrity look-a-likes for that friend, along with electronic information on products and services that can be conveniently purchased to enhance the friend's resemblance to the celebrity.

Another object of the invention is the creation of a system which utilizes facial image recognition search engines as a means of comparing facial images entered as queries with facial images in the database in order to find multiple best-fit matches, linking the matches, and/or position faces similarly for visualization purposes. Advantages of this object are that a series of medical patient facial images taken periodically, linked and consistently positioned for display by the invention can have multiple levels and types of medical benefits. Currently, doctors and health care providers physically walk rounds to monitor patients and an important aspect of their monitoring is viewing the patients face. Unfortunately, all the time restraints of physically going from room to room, and the mental stress and challenges of remembering so many patients over many days of treatment can lead to oversights, and even mistakes. This object enables the doctor or medical staff to conveniently and efficiently review a patient's facial health in time-lapse view. This object also enables improved facial comparisons, less memory, less stress, and less workload for doctors and medical staff, an ultimately more effective health care for patients.

Similarly video clips can be classified and organized so that daily physical therapy sessions can be reviewed conveniently and efficiently, especially if reviewed in above real-time.

Another object of the invention is the additional use of automated means to apply Facial Action Coding System (FACS) analysis to faces periodically captured or in video as above.

A further object of the invention is the creation of a system which utilizes entry of a facial image, along with alphanumeric characters to narrow the search. Boolean expressions (A AND, NOT, OR, NAND, NOR, and XOR B) can link images with text as a means of narrowing the search for "key-face" and multiple similar facial images. Similarly, a plurality of images can be used in Boolean expressions.

A further object of the invention is the creation of a system which utilizes entry of a facial image along with alphanumeric characters to narrow the search by setting boundary conditions. Numeric or Alphabetic boundaries such as search facial images with age between 20 and 30; or facial images that are associated with a first name starting with 'J', or both genders, or only males, etc. can reduce the number and types of facial images compared against as a means of narrowing the search for "key-face" and multiple similar facial images. Similarly, a plurality of images can be sorted by using Numeric or Alphabetic boundaries expressions.

A further object of the invention is the creation of a system which utilizes entry of geographical coordinates in addition to the facial image in order to narrow the search for "key-face" and multiple similar facial images. These coordinates can be entered by means of GPS, triangulation of cellular telephone towers, locality, region, country, continent, or the like.

Yet a further object of the invention is the creation of a system which utilizes entry of time and date of image capture along with the facial image in order to narrow the search for "key-face" and multiple similar facial images.

An additional object of the invention is the creation of a system which utilizes entry of video clips or an image containing faces with a spoken word using Voice Recognition Technology (VRT) or a conventional keyboard to further narrow the search for "key-face" and multiple similar facial images.

Another object of the invention is the creation of a system which utilizes the use of Optical Character Recognition (OCR) technology to read and interpret text associated with captured facial images, such that the text is entered as a search term accompanied by such facial images to narrow the search for "key-face" and multiple similar facial images.

Another object of the invention is the creation of a system which enables advertisers or marketers to preplan response to the entry of facial images of celebrities, models, actors, and virtual faces in advertisements by providing facial images contained in said advertisements or other faces seen within as "key-face" images for use by those who update the facial image recognition search engine and its associated facial image database, to enable the return of the "key-faces" and/or multiple similar facial images and their links to relevant products, services, discounts, and the like. Examples, One inventor entering her own facial image into the invention utilizing a facial database of celebrities returning the top three best-fit matched celebrity persons she resembles as Marisa Tormei, Joan Jett, and Liz Taylor along with fashion, cosmetics, and other endorsed or promoted products for each of these three best-fit look-a-like celebrities; image capture of a magazine advertisement with a celebrity who is best-fit facial image recognized to his "key-face" image, along with his brother and both images are returned, along with links to relevant products; image capture of a hand drawn long thin face type is best-fit facial image recognized against a database of facial shapes with links to cosmetics and application techniques optimized to enhance the beauty of such long thin faces, etc.

Other objects of the invention are obtaining more information about products and services and, if desired, purchasing or leasing them. This object is enabled by the user's capturing of a facial image of persons linked and associated with a product or service, the entry of said facial image as an input into a facial image recognition search engine, and the provision of links to commercial Web sites by those who update the facial image recognition search engine and its associated facial image database.

Another object of the invention is the creation of a system to aid education. In this embodiment, the user captures a facial image and obtains information about the subject of the facial image from online educational sources such as books, encyclopedias, dictionaries, Web resources, and the like. This object of course requires that a facial image database of such historical or contemporary persons be built.

Another object of the invention is the creation of a system which enables the user to share the celebrity look-a-likes for at least one person. In this embodiment, the user captures an image of a person of interest and obtains the celebrity look-a-likes images and other information to share with the person of interest to start up an interesting conversation, meet new people, etc. For example, a young man seeking to start a conversation with a young woman, could use the invention though his cell phone, and start the conversation by showing the young woman which celebrities she most look-a-like.

A further object of the invention is the creation of a system which can act as a celebrity fan's travel guide, which gives the user the capacity to capture a celebrity image and obtain information such as locations, bio description, current news, favorite attractions, where they like to stay, where they like to eat, normal transportation preferences, and the like.

A further object of the invention is the creation of a system which enables innovative medical monitoring and diagnostics by processing images for standard formats and display positioning along with time sequenced visualization of similar facial images periodically captured from a specific patient. The visualization includes but is not limited to: opaque, semi-transparent, fading, morphing, blinking, overlapping, mirroring, adjacent, superimposing, time-sequencing, warping, distorting, scaling, coloring, highlighting, and grouping said facial images. Examples: color tone monitoring could automate detection of yellowing skin in jaundice; convenient doctor patient reviews with the time lapse images showing at a glance what is now all workload and memory burdens for busy doctors making rounds; weight loss or gain from facial changes over days, etc. This object is particularly useful in the context of the expanding home care and remote telemedicine fields. Combined with automated control of the capture camera, and light levels in the room this object can provide entirely new classes of non invasive and extremely accurate new medical tools.

A further object of the invention is the creation of a system which enables innovative uses of the returned similar facial images for semi-transparent superimposed display of the user's facial image within sequences of similar facial images to train cosmetic application, facial expression mimicking, etc; This object advantages include playing back video training by a celebrity on how to apply her style and brand of make up. Utilizing a standard web camera, the users face can be played back on the electronic display with the celebrity's scaled faced to match the size of the user's face in the display, (one-to-one ratio is preferred, but other ratios also work). Either or both the user face and the celebrity face can be adjusted for transparency so that the user is able to use the celebrity face as an overlay guide, to apply make-up, or mimic facial expression. The object is advantageous for semi-transparent video as well. An embodiment of the invention that utilizes a back projected semi-transparent mirror for the training facial images works well with a user seeing their own face reflected within the mirror. Several of the innovative new use applications of the invention utilize the embedded image processes within commercial facial image recognition software to automatically position and link images for such new applications.

A further object of the invention is the creation of a system which enables innovative and intuitive automatic linking of similar facial images for enhanced and improved organization, classification, and fast retrieval objects and advantages. For example, a graphic artist deriving multiple different facial images for a movie character could use the invention to automatically organize and link for convenient retrieval the original facial image and its derivatives. On a much grander scale, the facial image recognition search engines' Web crawl coupled with the inventions automatic linking can produce facial image based links which replace or enhance the current key word catalogs and link farm indexes.

In accordance with one embodiment the present invention comprises a system for accessing multiple similar images and electronic data by providing an image containing faces comprising: (i) a means for capturing an image, (ii) a means for transmitting said image to a facial image recognition search engine with an associated facial database wherein the facial image recognition search engine with an associated facial database comprises: a. a means to receive said image, b. a means to extract and process facial images from the input image, means to obtain "key-face" and/or multiple best-fit matches of similar facial images, and means to access electronic data associated with said facial images, and c. a means to transmit said "key-face" and/or similar facial images and said data to a display unit.

In accordance with another embodiment the present invention comprises a method of extracting "key-faces" and similar facial images and associated electronic data from a database by providing an image captured by capturing means comprising: (i) providing computer coded facial images stored in the facial image database and further linked to electronic data, (ii) entering captured image containing faces, (iii) performing facial image recognition functions to computer code extracted facial images from said captured image, (iv) matching said computer coded facial image to said computer coded facial images stored on the database, (v) linking said captured facial image to matched "key-face" and/or similar facial images and said linked electronic data, and (vi) presenting said electronic data on a display unit.

While others continue to struggle trying to solve the general image search problem, viable niche image search solutions have been ignored. This lack of viable niche image search solutions within the prior art is clearly demonstrated by their lack of popular use within the current multibillion-dollar Internet Search Engines. In accordance with another embodiment the present invention comprises a method of Automated Facial Image Linking to Endorsements, Marketing, Advertising, and/or Points-Of-Sale for Related Products and Services Additional lacks within the prior art are utilization and exploitation of highly developed Human capacities to recognize Human faces and related affective emotions associated with those faces. Darwinian Natural Selection of Humans who are social animals have over the history of mankind directly selected for such highly developed facial recognition skills within successful Human descendents alive today. To a limited extent the advertising community has succeeded in utilizing our celebrity driven popular culture to relate celebrity faces to positive emotions that affectively aid in sell celebrity related products and services. Typically, the advertising community manually works piecemeal with signed celebrities to produce stove-pipe ad campaigns whose effectiveness can only be grossly estimated as a ratio of increased sales to costs of the celebrity advertising. Specifically, the invention objects and advantages include:

1. An automated convenient method for linking celebrity facial images to all their related endorsements, marketing, advertising, and points-of-sale of products and services. Or selectively filtering based upon fee basis, etc.;
2. Automated convenient methods for linking any model's, actor's, or any person's facial images to their related endorsements, marketing, advertising, and points-of-sale of products and services;
3. Automated convenient methods of tracking accessing of celebrities' information, to accessing endorsements, marketing, advertising, and/or points-of-sale for celebrity related products and services;
4. Reverse methods of tracking products, services and even points of sale (stores, brands, on-line web sites, etc) of interest to the celebrities that endorse, market, and/or advertise them.

Other objects and advantages include Automated Facial Image Linking for Emotional and Health Monitoring and Diagnose based upon Darwinian Natural Selection of Humans which has also highly developed the capacity to judge other Human individuals health and emotions based upon the individuals face. Specifically, facial skin coloring, dark circles under the eyes, redness of eyes, lips, cheeks, ears, etc all give clues to the relative health of an individual Human. Doctors and medical staff routinely note differences in an individual's facial characteristic as a key component of monitoring and diagnosing their patients. Unfortunately, the current status quo requires the doctors and medical staff to physically walk rounds to view patients on a periodic basis with the heavy burden and workload of memory and comparisons from prior visits being required within the brain of all concerned medical staff and doctors. Such manual methods are slow, lack consistency and reliability, and are error prone. Specifically the invention objects include automated methods to conveniently periodically image capture patients facial images so that doctors and medical staff can view the time lapse facial images to judge progress of patients, and/or aid in diagnoses. Further objects and advantages are the use of automated means to read and record the universal emotions from patients' faces utilizing the Facial Action Coding System. A patient's morale and emotional state are so important to their recovery, so this automated means can be utilized to judge the patients in such a manner.

In accordance with another embodiment the present invention comprises a method of Automated Real-Time Semi- Transparent Superimposed Facial Expression Mimicry based upon Darwinian Natural Selection of Humans highly developed capacity to mimic the actions of other Human individuals. The mere act of watching another Human performing a task activates Mirror Neurons within the watching Human that correspond to the same areas of the nervous system as the human actually performing the task. These innate mimic abilities seem to work over a wide range of viewing angles and distances. Facial expression mimicry is a specially developed ability in social Humans. Specifically an object of the invention is the use of real-time semi-transparent superimposing of a person face wishing to mimic the facial expression of another Human. This method is very intuitive and easy to use with the semi-transparent superimposed training face video acting as a real-time guide to follow with own face expressions, (sequence, timing, and extents), Another object of the system of the present invention in the information technology context, utilizes web-crawlers or spiders to explore the web and exploit facial images contained in web pages and files for indexing to provide universal facial image database for facial image based enhanced and improved organization, classification, and fast retrieval objects and advantages.

As highlighted in the prior paragraphs multiple unobvious commercially viable niche facial image recognition search engine solutions to the general image search engine problem that have not yet been discovered nor implemented in the prior art are objects and advantages of this invention.

BRIEF DESCRIPTION OF THE DRAWINGS

A further understanding of the present invention can be obtained by reference to embodiments set forth in the illustrations of the accompanying drawings. Although the illustrated embodiments are merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

DETAILED DESCRIPTION AND OPERATION OF THE INVENTION

Detailed illustrative embodiments of the present invention are disclosed herein. However, techniques, systems and operating structures in accordance with the present invention may be embodied in a wide variety of forms and modes, some of which may be quite different form those in the disclosed embodiment. Consequently, the specific structural and functional details disclosed herein are merely representative, yet in that regard, they are deemed to afford the best embodiment for purposes of disclosure and to provide a basis for the claims herein that define the scope of the present invention. The following presents a detailed description of a preferred embodiment of the present invention.

Figure 1A:
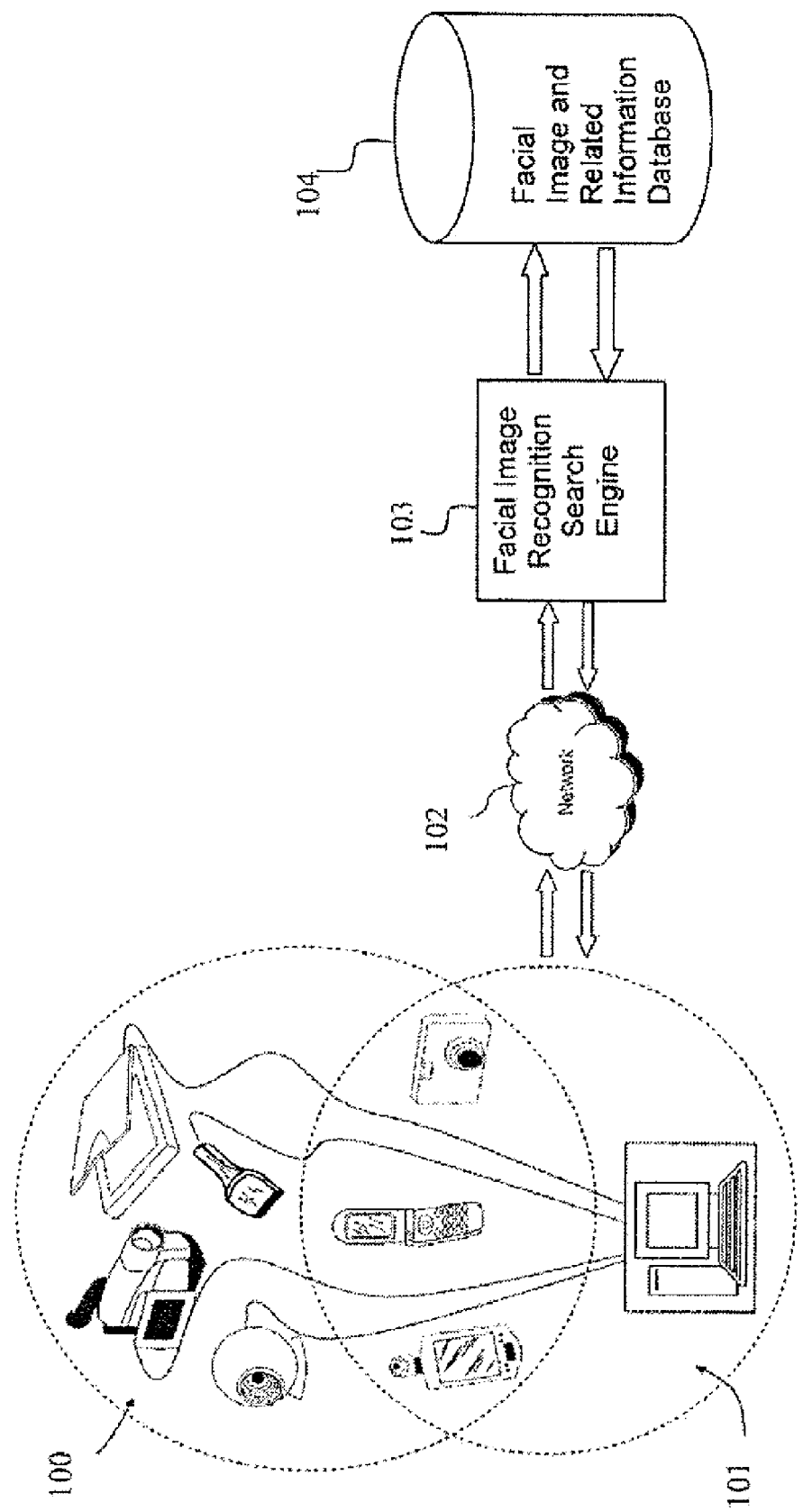
FIG. 1A depicts an illustration of the interaction of the major components of an image capture device, transmission device, network, facial image recognition search engine and its associated facial images and related information database, and in accordance with the present invention.

The present invention provides a system capable of capturing images containing faces, entering the images into the facial image recognition search engine, extracting facial images from the captured images, best-fit matching to "key-faces" and linking to associated information with each image, and presenting "key-face" images and the information to a user. Further, the best-fit matching can be to multiple similar facial images, along with linking to associated information with each image, and presenting the information to a user or users. Image capturing devices 100 capture the image containing faces and then transfer the image to communication devices 101 having transmitting and receiving means capable of communicating with facial image recognition search engine 103 and its associated facial image and related information database 104 through network 102, as shown in FIG. 1A. Wherein the transmitting and receiving means are any means capable of transmitting and receiving electronic signals. The images containing faces can be captured from a visual entity (object, people, animal, places, or anything capable of being captured by an image); captured from sensor images, entered from a printed material (photograph, book, magazine, poster, identification card, credit card, bank card, passport, advertisement, or any other printed media); copied from an electronic display unit (computer monitor, hand-held device screen, electronic message packets, internal framebuffers, or any other similar device); captured from projected visual information (still image, film, video clip, sensor output, streaming hologram, etc.), or any other means known for capturing images containing faces.

Network 102 can be of any type, including but not limited to a network that is wired, wireless, GSM, ISDN, Ethernet, CATV, Wi-Fi, LAN, Bluetooth, or the like. Likewise, the capturing apparatus can be any device capable of transferring a real-time visual entity into a digitalized image such as, but not limited to, digital/analog cameras, video cameras, scanners, hand-held scanners, camera-enabled cellular telephones, camera-enabled PDA's, sensors, or the like. The communication device can be any device or combination of devices having communication functions and displaying means such as, but not limited to, a hand-held device, cellular telephone, hybrid cellular telephone/PDA device, PDA, remote server, RFID device, Internet-accessible camera or sensor, personal computer, laptop computer, pocket computer, hybrid electronic device, or the like. The image-capturing device can be connected to a communication device through a hard-wired data link, wireless data link, or any other type of connection. Many image-capturing devices and communication devices are integrated into one unit, or can be integrated into one unit, such that any communication device can have image capturing capabilities and vice versa. The combination of the plurality of image-capturing devices and the plurality of communication devices will be referred to as CI devices (Communicable-Imaging Devices) hereinafter due to the difficulties with making definite distinctions between these devices.

Figure 1B:
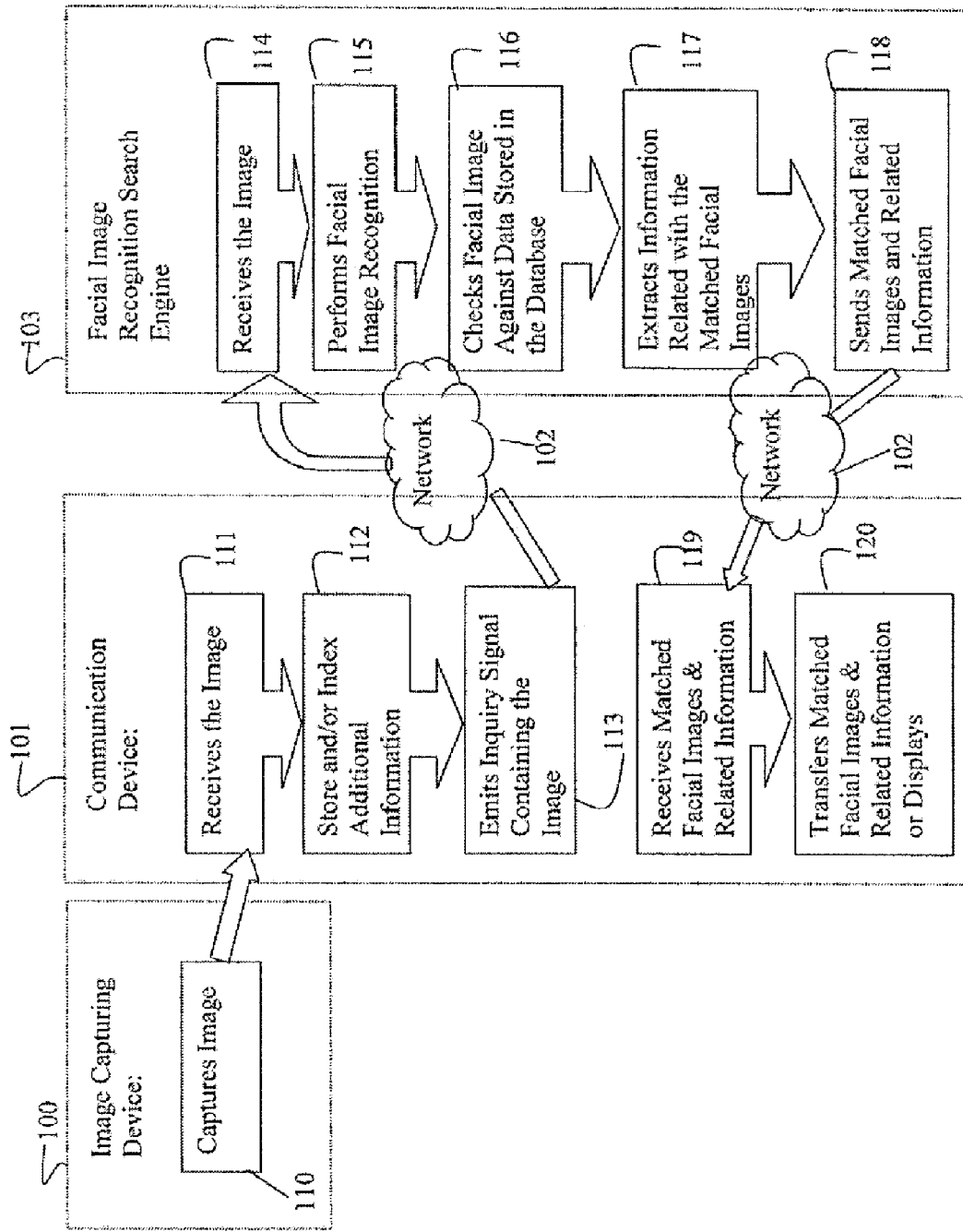
FIG. 1B depicts a flow diagram illustrating the methods and possible order of component interaction within the components of FIG. 1A.

A possible method of component interaction and the associated processes are depicted in FIG. 1B wherein the image-capturing device 100 captures an image containing faces, shown in process 110, which is received by the communication device 101, as shown in process 111. Communication device 101 processes the image, as shown in 112, by storing the image, and/or obtaining and indexing additional information about the image. Communication device 101 then transmits the image to the facial image recognition search engine 103 via a network 102 in process 113. After receiving the image in process 114, the processing means associated with facial image recognition search engine 103 performs facial image recognition functions of process 115 and compares the image with facial images stored within associated facial database 104 in process 116. After finding a best-fit match or matches, from associated facial database 104 (not shown), the facial image recognition search engine 103 extracts information the best-fit match or matches facial images associated with the captured facial image, along with related electronic information from associated facial database 104 (not shown) as in process 117, and further transmits the information back to communication device 101 thru network 102, as shown in process 118. Communication device 101 receives the best-fit facial images and related information, as shown in process 119, and displays the information on its display screen or an associated display device of process 120.

The disclosed system utilizes facial image recognition technology to define a facial image and retrieve information about it from a large database. Many techniques can be used for facial image recognition as it has been an emerging field since the mid-1900s. The most widely-used approach for facial image recognition is object extraction, as is done by many of the current commercially successful facial image recognition products. These commercial products automatically extract the facial images from the surrounding background in input images, and then parametrically manipulate the extracted facial images for comparison against previously manipulated and many times standardized image formats. However, these areas still require improvement for reliability. Nevertheless, the present invention envisions future applications for potential use of these new technologies as the image-recognition process in this invention.

The information associated with the facial images varies with different system applications. The source of information can comprise a single service provider site, combination or network of sites, or the entire universe of available information on the Internet. In a single site and a single application, each image or a group of images is linked to preset information. Essentially, each image or a group of images can have a webpage associated with it. For example, in FIG. 2A a user enters the path within a text edit input box 290 which is the input area to specify a path and filename to your input photo or picture; The user then sets the search option radio buttons 292, or accepts the default radio button selections; the user then presses the Find my Match Now link 294 and the top three celebrity look-a-likes and their related information are delivered to display area 295, the related information shown are links to other parts of the web site, ads (pay per click fees too), and point of sale opportunities on-line and/or guidance to nearby locations to buy the product of service. The user also has further options to obtain more celebrity matches by clicking on the "More Celebrity Matches" link 296, or emailing the current page showing their input image, along with the look-a-like celebrities and their related information by clicking on the "Email your Celebrity Look-A-Likes to a friend" link 297; users can also automatically link the input image to the retrieved celebrity images by clicking on the "Automatically link Facial Image" link 298 Area 299 on the bottom right depicts examples of social network tie ins for this Web page version of the invention.

Figure 2A:
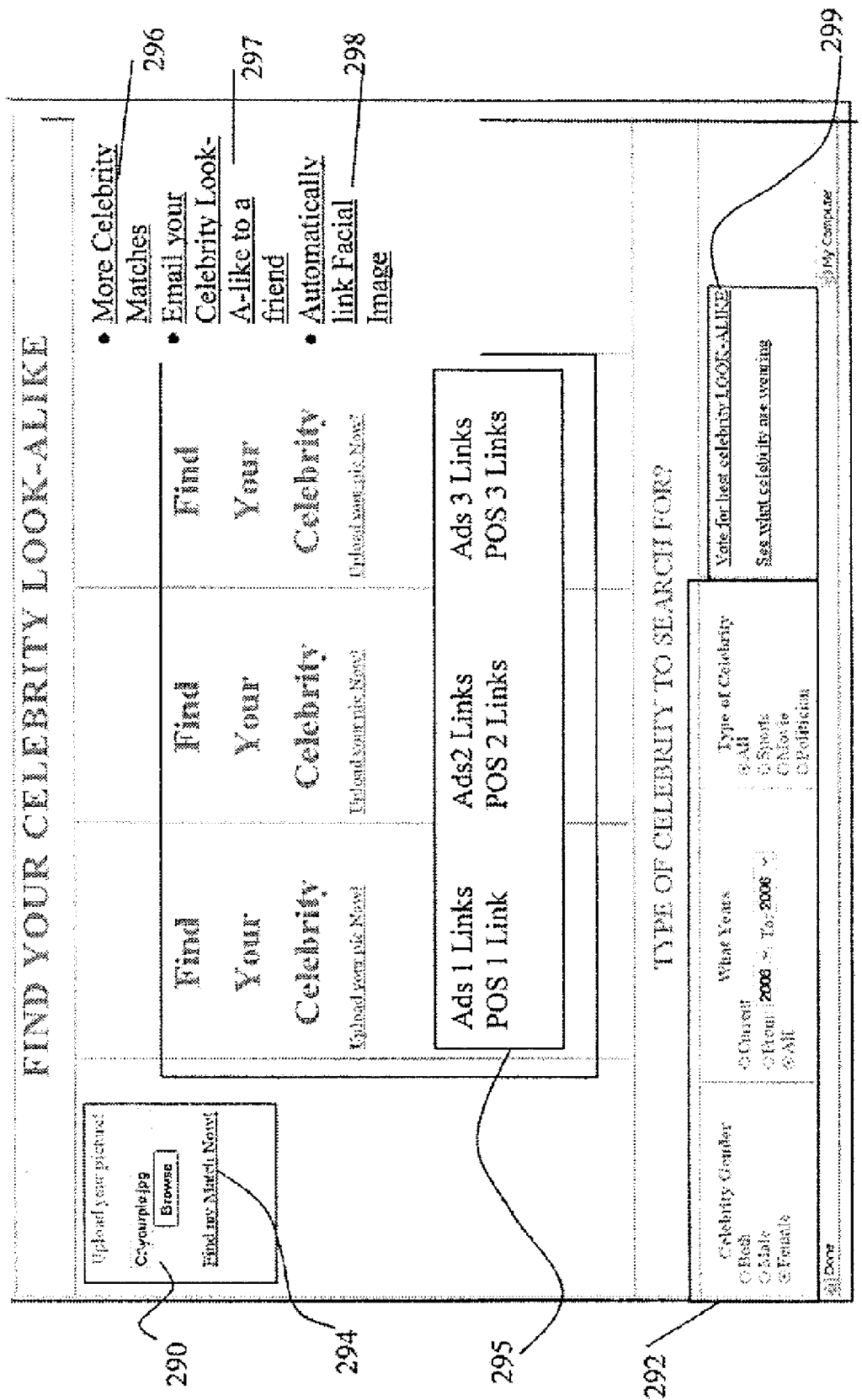
FIG. 2A depicts a screen shot of an exemplary interface of the facial image recognition search engine and its associated facial images and related information database in accordance with the present invention prior to returning celebrity look-a-likes for one of the inventor's facial image as input.
Figure 2B:
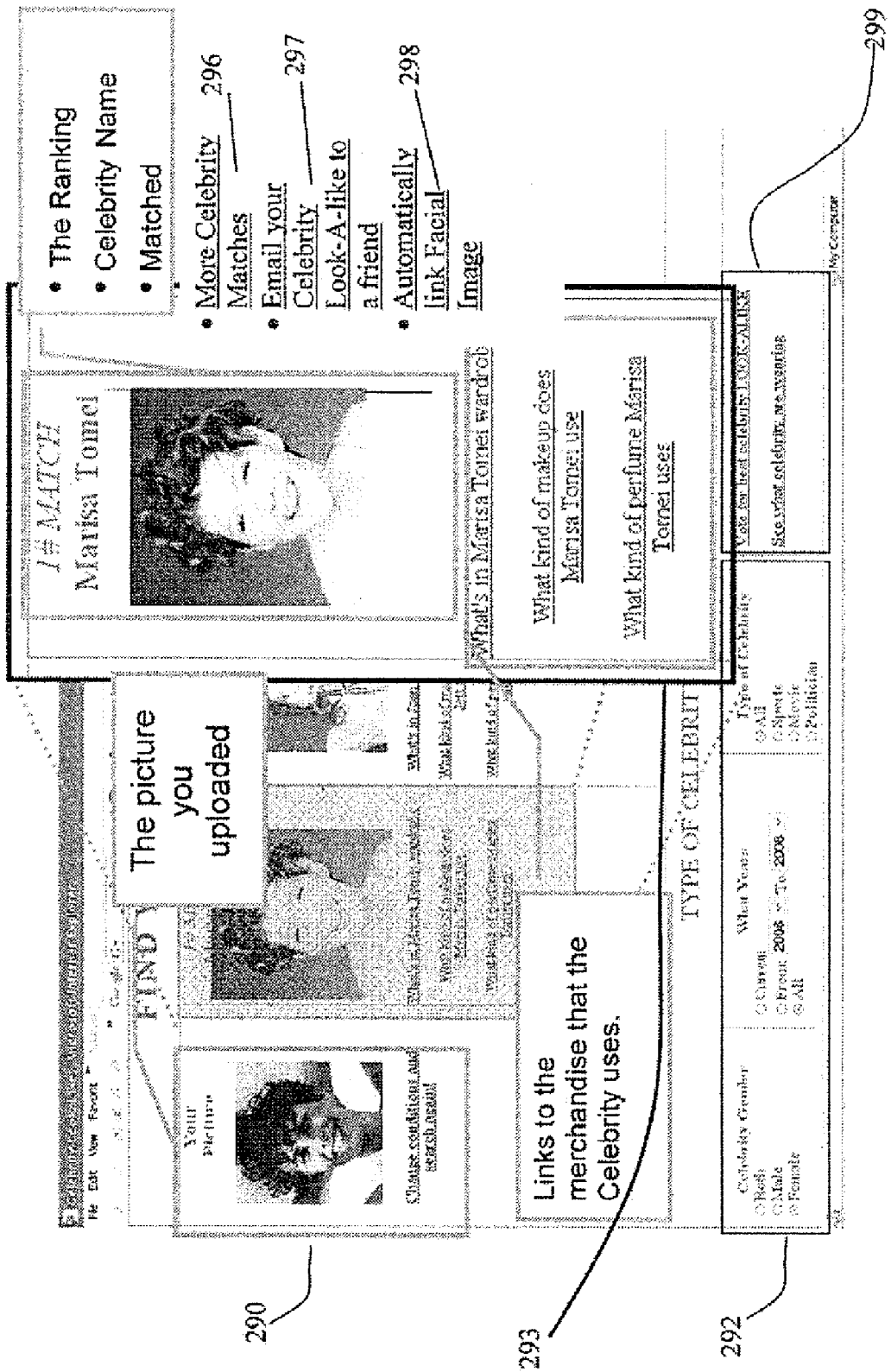
FIG. 2B depicts a screen shot of an exemplary interface of the facial image recognition search engine and its associated facial images and related information database in accordance with the present invention after returning three celebrity look-a-likes for one of the inventor's facial image as input.

FIG. 2B depicts another commercial application of the invention where a one of the inventors facial image has been submitted via the text edit input box 290; the search option radio buttons 292 have been selected to search for all types of female celebrity look-a-likes; which are displayed in display area 295 along with celebrity related marketing and sales opportunities. In this embodiment the user also has further options to obtain more celebrity matches by clicking on the "More Celebrity Matches" link 296, or emailing the current page showing their input image, along with the look-a-like celebrities and their related information by clicking on the "Email your Celebrity Look-A-Likes to a friend" link 297; users can also automatically link the input image to the retrieved celebrity images by clicking on the "Automatically link Facial Image" link 298 Area 299 on the bottom right depicts examples of social network tie ins for this Web page version of the invention.

Figure 2C:
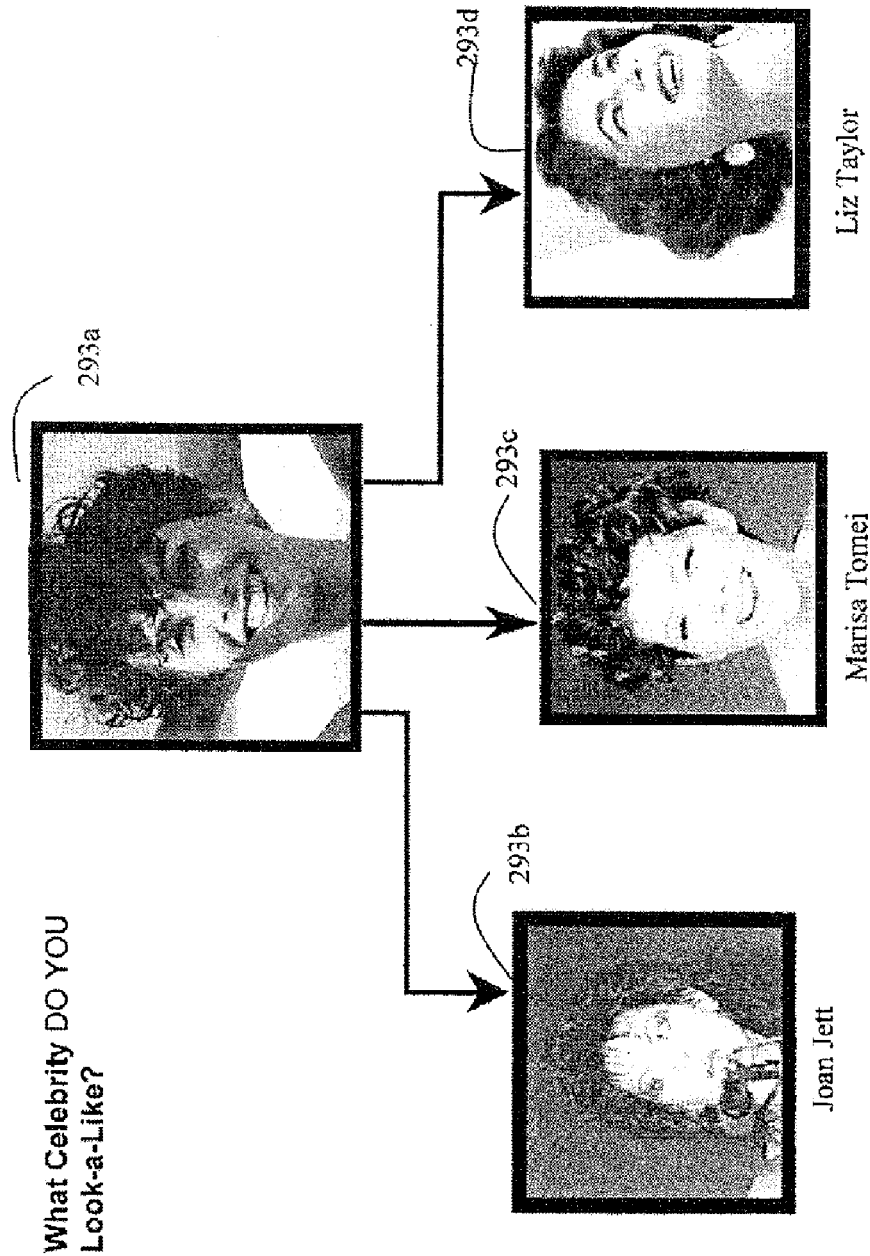
FIG. 2C depicts the automatic linking of inventor's facial image as input to the returned three celebrity look-a-likes facial images.

FIG. 2C depicts the automatic linking of inventor's facial image 293a as input to the returned three celebrity look-a-likes facial images 293b, 293,c, and 293d. This figure illustrates the linking hierarchy of the returned facials images to the original input facial images. Such linkages can be saved for the user and others to reuse without requiring the repeating the search and link processes.

Figure 3:
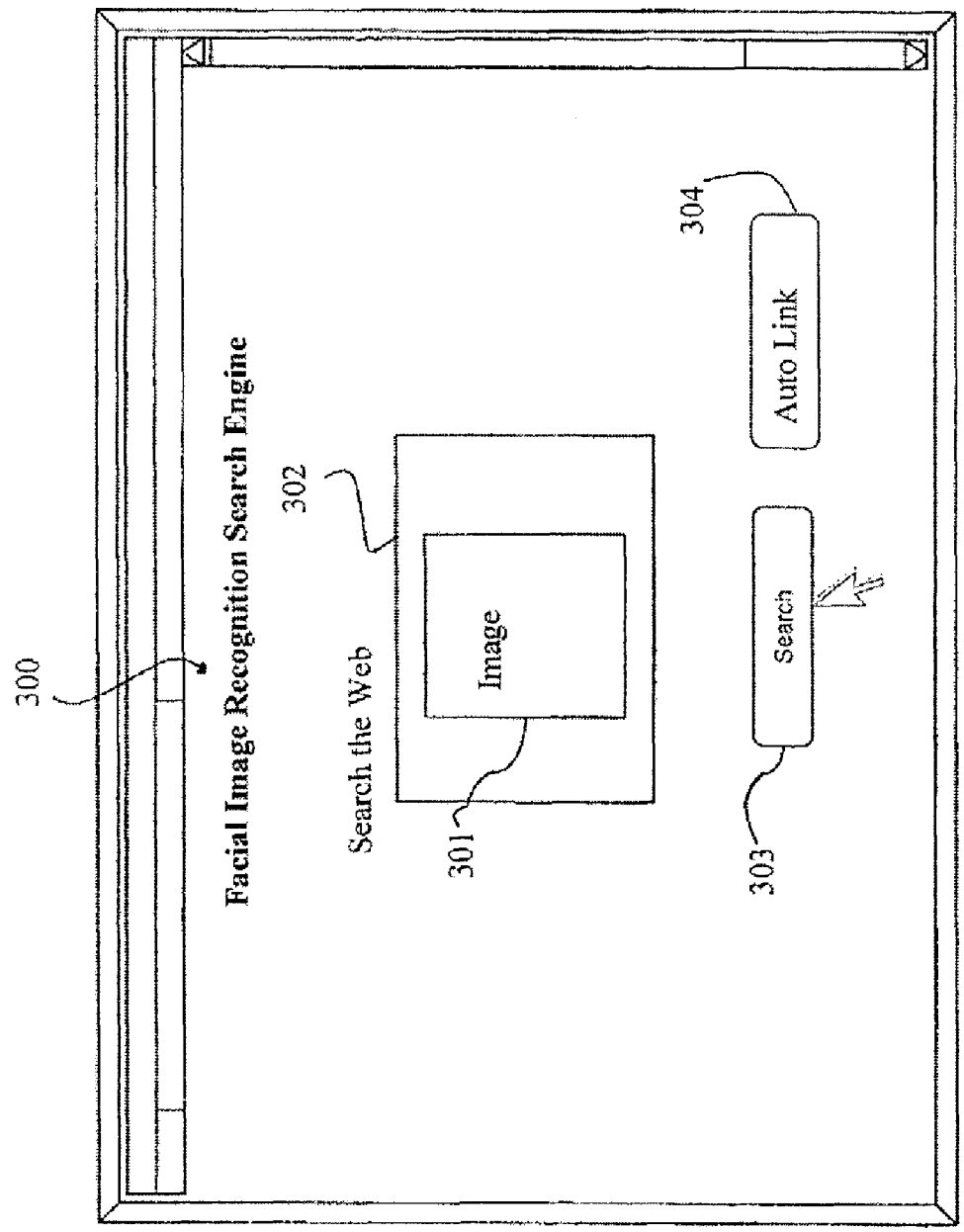
FIG. 3 depicts a screen shot of an exemplary interface of the facial image recognition search engine and its associated facial images and related information database to search for best-fit matched facial images along with each images related information in accordance with the present invention. Additionally, an auto link button for linking facial images is shown.

Another example of images being associated with pages is depicted as a user enters image 301 to search engine 300, shown in FIG. 3. The image can be entered into search field 302 in variety of possible ways, such as, but not limited to, cutting and pasting the image, dragging and dropping, uploading the image file, automated email answering with embedded or attached image, typing the path location to the search engine, and the like. As the user enters the image and initiates a search by pressing button 303 or automated means, the system identifies the best-fit facial image or images and directs the CI device to the webpage or pages associated with each image and its information. Additionally, these sites may require a subscription to the service and/or charge the user per each service usage. Since the CI device requires some communication subscription, the services can be charged to the existing communication subscription as well. For example, if a cellular telephone is used, the user may receive a charge on his or her cellular telephone service provider bill. However, the system might also be financially supported by sponsors' links, pay-per-click, ad-ranking biding systems, and other advertising revenue and purchase commission fees and schemes.

If multiple sites of information are used, the facial images stored in the database can be indexed with text identifiers or the like, such as an image title, titles, or names of face in the image, related products and services, etc. If the user enters image 301 to search engine 300 of FIG. 3, the captured facial image is matched with a stored facial image and associated with the indexed information about that stored facial image. This information then can be used to search the World Wide Web, USENET newsgroups, and other sources, to retrieve additional desired information about the image. As well, other restrictions can be enforced. For example, the system might allow only certain websites to be searched or might prevent some websites from being searched. As a result, desired privacy can be protected.

Figure 4:
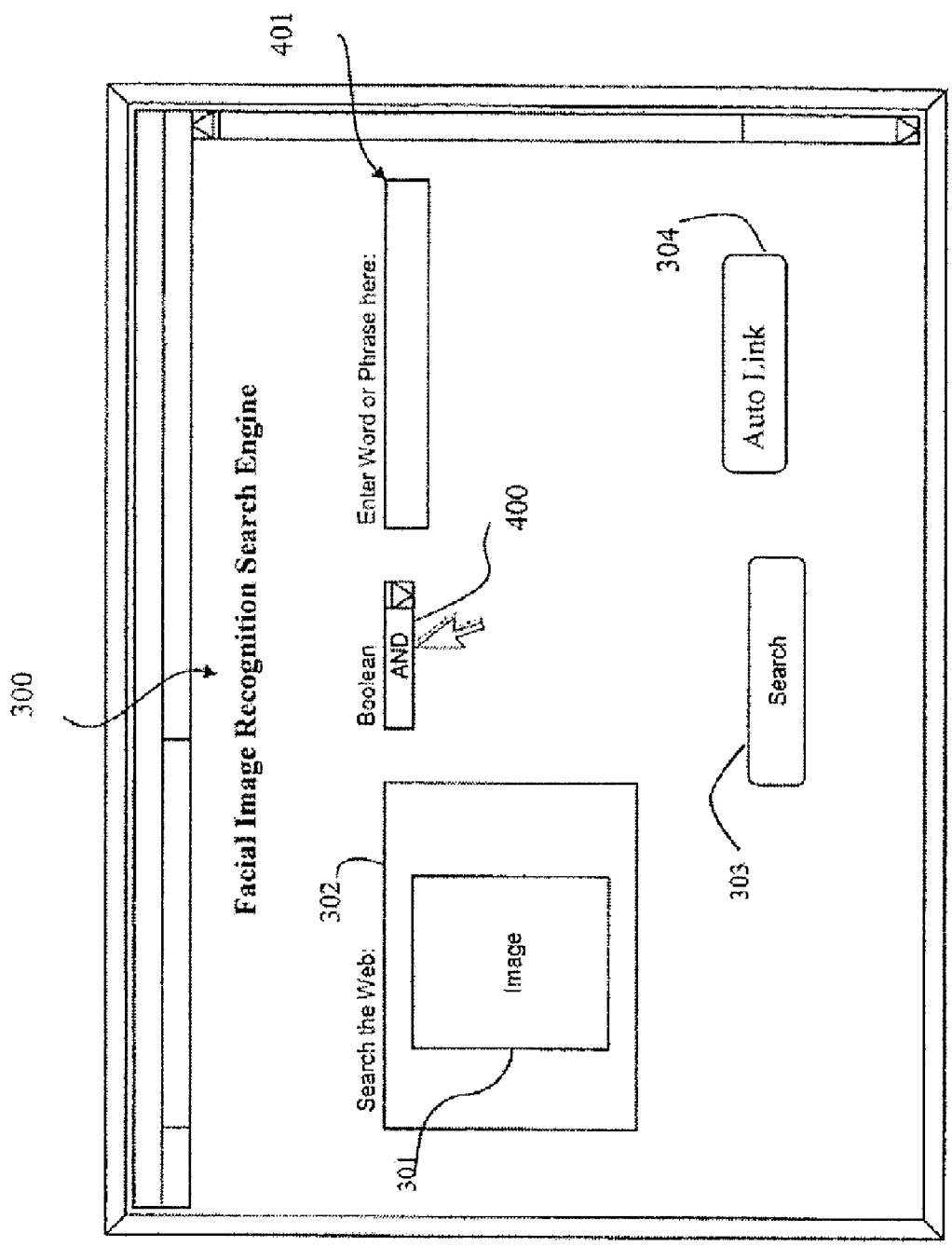
FIG. 4 depicts a screen shot of an exemplary interface of the facial image recognition search engine and its associated facial images and related information database to search images in addition to a text query via Boolean parameters in accordance with the present invention.

When searching a large facial image database, many matches can be found for a singular facial image, resulting in an excessive number of results. Consequently, the user could be presented with more source of information than he or she needs. To narrow the field of the search, the user can specify particular information she desires within the scope of system application through the use of a list ordered by best-fits first, and/or Boolean expressions as illustrated in FIG. 4. The user enters image 301 into search engine 300, chooses to add a Boolean expression via pull down menu 400, and enters inquiry information into field 401, narrowing the field of the search.

Boolean expressions, such as AND, NOT, OR, NAND, NOR, and XOR, and the like, can be chosen from the pull down menu or typed into the search engine manually. Inquiry information inputted into field 401 can be anything associated with the image, anything the user wishes to discover about the image or anything the user wishes to know about in conjunction with the image. The system can identify captured image 301, extract information associated with the image, and further perform a search utilizing the information associated with the inquiry information from field 401. In an alternative method to narrow the search, the system can first search for images associated with inquiry information from field 401 then use the found group of images and match them to the captured image 301, and extract the information regarding the image. Additionally, the search engine 300 could function such as disregarding the Boolean inputting field 400 and using a default Boolean parameter to search the database. In such case, it is preferred and common in practice to use the AND parameter.

Also, the utilization of OCR technology to achieve a more automated system is possible. The system can transform facial images with embedded text into key words and enter those key words as search terms for the search engine, further shaping the extent and nature of the facial image recognition search. When a photo is entered into our system of a famous sports star that advertise for Nike, the Nike text can be extracted from on-line ad images and used as an index. Alternatively, a series of alphanumeric characters, such as key words, is generated and entered by a user to further clarify and narrow the search. Another alternative is for the user to select radio buttons 292 that bound the search as are shown in FIG. 2A and FIG. 2B. For example, a user can restrict the facial image matching of the input photo to females, or to sports stars, etc.

Figure 5:
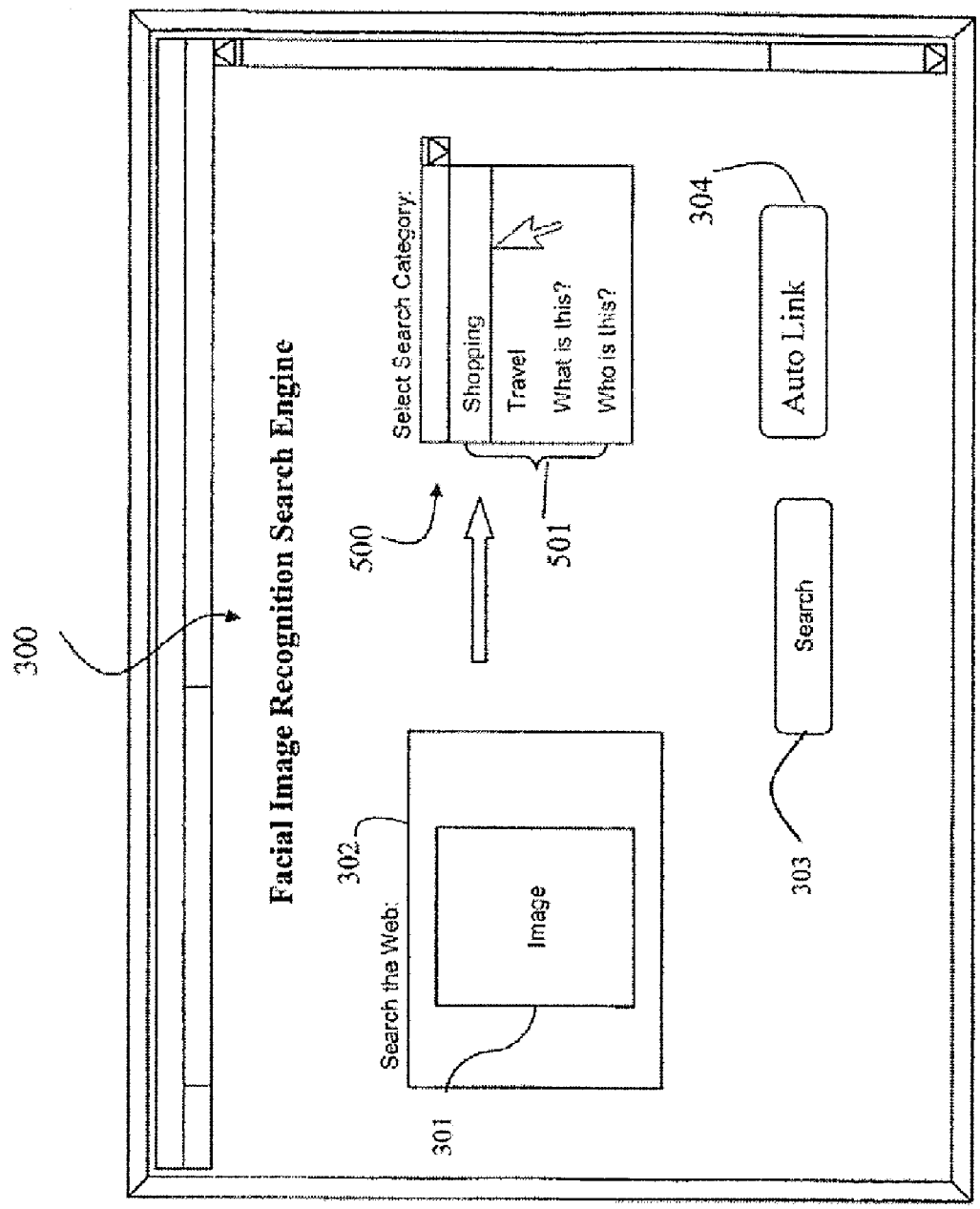
FIG. 5 depicts a screen shot of an exemplary interface of the facial image recognition search engine and its associated facial images and related information database to search images via search categories in accordance with the present invention.

When applying the system to multiple applications, the database search can be arranged into categories as shown in FIG. 5. The user enters image 301 into facial image recognition search engine 300, and specifies the type of image captured or the type of information she desires to extract by choosing from category list 501. For example, different types of searches can be performed based on what the user wants to know. For example, if the input facial image is of a celebrity singer, and musical information is desired, the search can be limited to singers and musical information. If input facial image is a politician and the user desires political information about him/her, the search may be limited to politicians and related political information. The CI device is programmed to provide the user with a menu 500 in which available categories are chosen from category list 501. In another embodiment, the user also may key or type a category of inquiry, or enter it by means of VRT.

Figure 6:
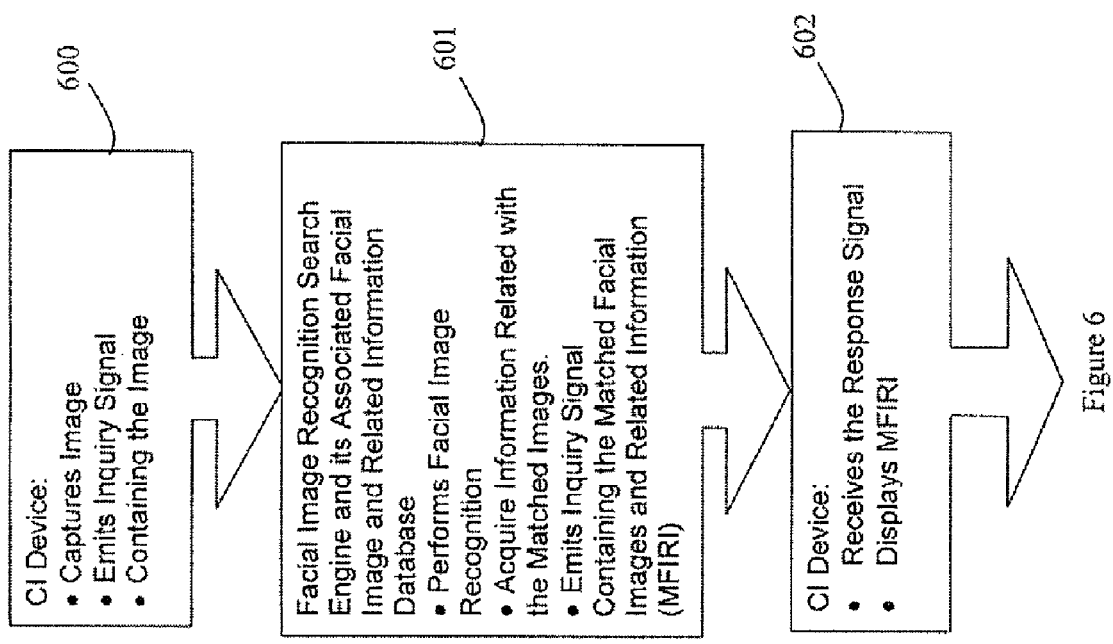
FIG. 6 depicts a flow diagram illustrating a process wherein an image is captured and processed by the facial image recognition search engine and its associated facial images and related information database in order to extract information about the image in accordance with the present invention.

A system of the present invention might comprise a CI device connected to a network where the process of operation is shown in FIG. 6. The CI device captures an image containing faces and emits an inquiry signal containing the image in process 600. The facial image recognition search engine receives the inquiry signal through a network, performs facial image recognition and matching, acquires information associated with the images, and emits a response signal containing the acquired matched facial images and associated information in process 601. Finally, the CI device receives the response signal containing the information and displays the matched facial images and associated information as shown in process 602.

Figure 7:
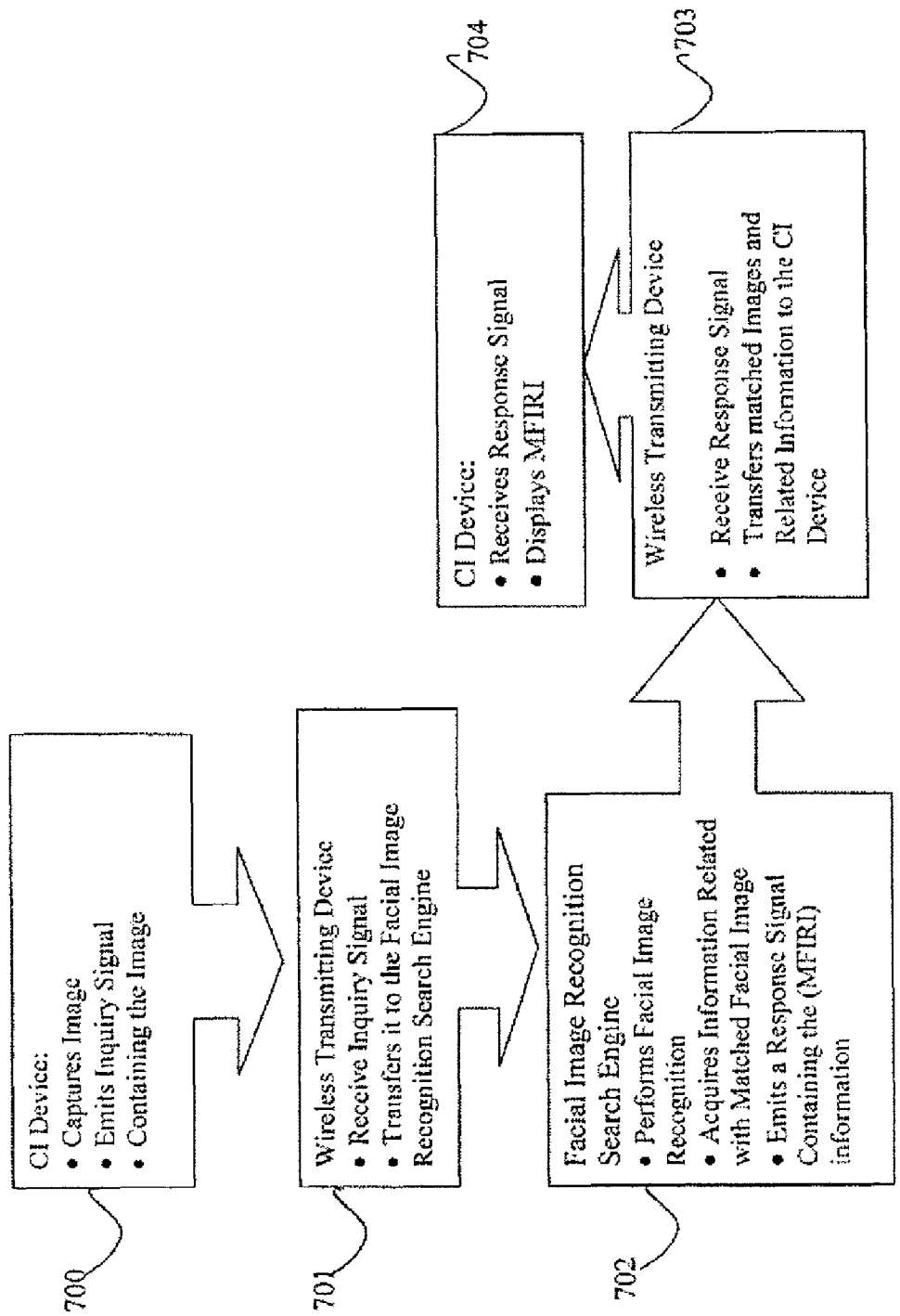
FIG. 7 depicts a flow diagram illustrating a process wherein a wireless transmitting device is utilized to transmit information between the communication device and the facial image recognition search engine and its associated facial images and related information database in accordance with the present invention.

If the CI device is wireless, a wireless transmitting device, such as a remote tower, is used to transfer the information from the CI device to a network, the process of its operation is shown in FIG. 7. The CI device captures the image and emits an inquiry signal as shown in process 700. The wireless transmitting device then receives the signal and transfers it to a facial image recognition search engine through a network in process 701. The facial image recognition search engine then performs facial image recognition, acquires information associated with the images, and sends the matched facial images and their associated information back to the wireless transmitting device in process 702 to be transferred back to the CI device in process 703. The CI device receives the information and displays it for the user on any number of wireless CI devices such as hand-held devices, cellular telephones, PDA's, laptop computers, or the like.

Figure 8:
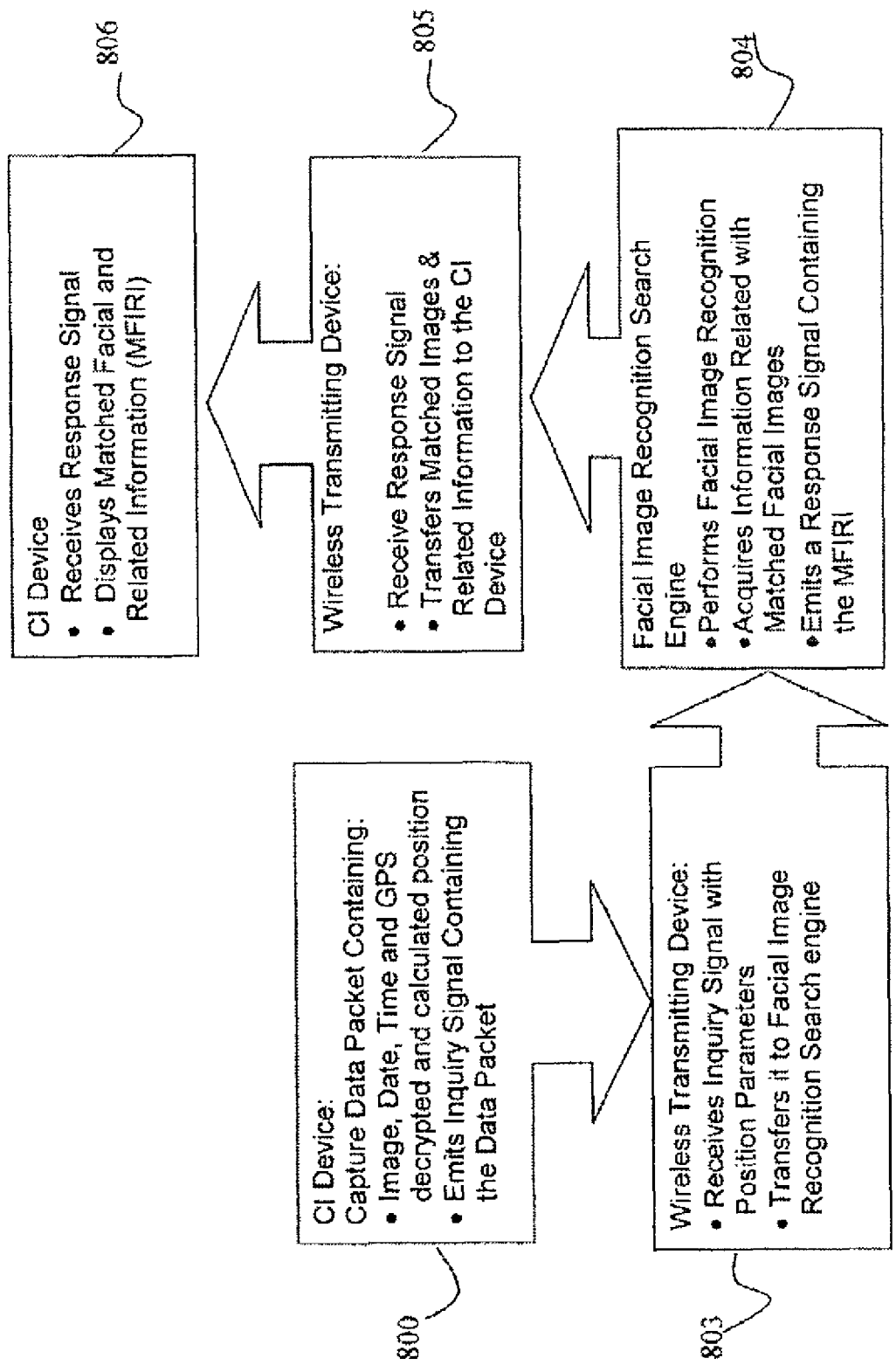
FIG. 8 depicts a flow diagram illustrating a process wherein additional constricting parameters such as GPS, date, and time can be used to further narrow and expedite the search in accordance with the present invention.

FIG. 8 shows a process of operation where a GPS-equipped CI device can additionally record the date and time of image capture. The CI device first captures an image, then records the time and date of image capture, and finally emits an inquiry signal with a data-packet containing the acquired information in process 800. A wireless receiving module with combined GPS decryption and calculation device receives the GPS signals and passes on the calculated GPS position information to the inquiry signal which is indexed into the data-packet as shown in process 802. The wireless transmitting device receives the indexed data packet and transfers it to the facial image recognition search engine for analysis in process 803. The processing means associated with the facial image recognition search engine performs facial image recognition functions and acquires information associated with the matched facial images and any additional information provided in process 804. The CI device receives the matched facial images and associated information through wireless transmitting device in process 805 and displays it on display screen in process 806 or an associated display unit.

The present invention has many important applications in the commercial sphere. The ability to capture a facial image find "key-face" images and related to a "key-face" celebrity, acquire information about it, and/or purchase celebrity related products or services by means of the CI device is desirable. The CI device might capture an image containing a celebrity in an advertisement in a magazine, and the related product of interest in same ad is one of the automatically returned purchase opportunities linked to the celebrity's facial image. Alternatively, the user can capture a celebrity facial image from another image, such as a pamphlet, TV commercial, monitor of a computer, screen of a hand-held device, magazine, newspaper, product label, poster, or the like. Furthermore, the system enables a user to capture a facial image of any person, to receive information related to the person, and to take a subsequent action such as making a purchase, leasing a product, arranging financing, or arranging delivery or pick-up of the product. For example, the photo of a real estate agent can link in to their listings, applications forms, etc.

Collectively, these described methods of returning key faces of celebrities, actors, and/or models in ads or media and/or multiple similar best-fit matched faces have multiple new business uses, especially on-line business uses to exploit the rising wave of on-line social network participatory users with convenient and effective advertising, marketing and sales. These innovative combined use of facial image recognition search engines with selected "key-face" facial databases to link celebrities, actors, and/or models facial images enables automated retrieval and organization of celebrity associated information, merchandising, endorsements, advertising, and/or convenient point-of-sale links. Our viable niche image search solutions comprises a method of Automated Facial Image Linking to Endorsements, Marketing, Advertising, and/or Points-Of-Sale for Related Products and Services that support multiple new business models including but not limited to "pay-per key-face image" selection or click; advertiser paid bid prices for list position and rankings for each celebrity, actor, model, etc.; percentage of facial image invention driven sales When capturing a facial image of printed media, various printed indicators can be useful for fast and accurate image recognition. Barcodes, serial numbers, model numbers, or any other identifying parameter can help to identify the product, since they are unique. Examples of commercial applications include, but are not limited to, real estate, retail stores, entertainment, and other such venues.

Figure 9:
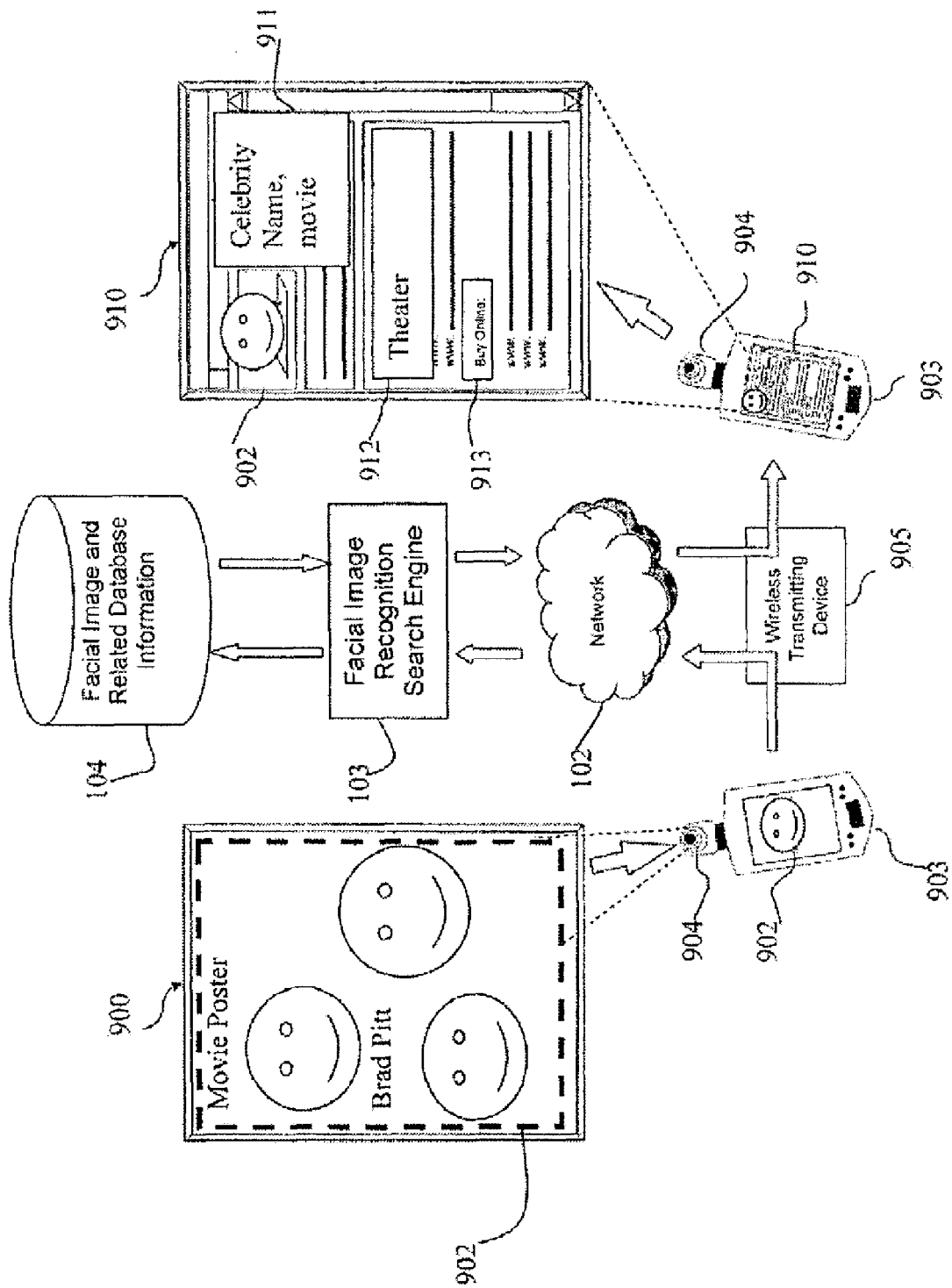
FIG. 9 depicts a practical use of the system of the present invention in the commercial context, wherein a user utilizes a camera enabled PDA to capture an image of a celebrity from a poster promoting a Movie and acquire purchasing information via the method of the present invention.

FIG. 9 shows an embodiment of the invention to acquire information about celebrity endorsed movie ticket purchase information and opportunities as a formatted reply 910 from a image capture of a movie poster 901 display within a theater marquee window 900. The user operates hand-held CI device 903, such as a hybrid PDA/cellular telephone with camera attachment 904, in order to capture facial image 902 of celebrity image from the movie poster 901. CI device 903 emits an inquiry signal to be received by wireless transmitting device 905 and transferred to network 102 that contains a facial image recognition search engine 103 and an associated celebrity facial image database 104. Facial image recognition search engine 103 receives image 902, performs facial image recognition, and accesses electronic information associated with that celebrity's facial image. CI device 903 receives the information that was accessed and displays it. In this case the electronic information associated includes places and different ways to buy tickets for the movie as shown in formatted reply 910.

The user of the system may be interested in a celebrity endorsed product, but not have the inclination to review the information about it as soon as it is retrieved due to time, money, and/or availability constraints. To accommodate for this, the system allows the user to capture an image of the product and store it for later use. Additionally, one might capture just email the celebrity "key-face" linked desired product to a home or business email account.

The product information associated with "key-face" linked product and services presented in the formatted reply 910 might consist of, but is not limited to, product description and information 911 in this case Celebrity Name and movie, store locations (in this case theater locations), pricing, availability, online purchase capabilities 913, along with purchase statistics, information about related products, and the like. Additionally, the information might consist of links to a plurality of retail store sites 912, product manufacturers, online stores 913, online auction sites, and the like. After reviewing the product information, the user is able to purchase the product using the acquired information. Alternatively, after capturing an image and instead of acquiring product information, the CI device is directed to an order placement site wherein the user can readily place an order.

Preferably, each user of the system has a personal profile such that the system can acquire information according to the user's criteria. The profile might consist of personal preferences, price limits, residency, taste, sizes, and the like. In another embodiment, providing the system with the residence or workplaces of a user allows linked search engines to extract proximate store locations. Moreover, the user might enter a current location, or the system might have positioning capabilities such as GPS to find proximate locations to the user at the time of image capture.

The personal profile might also include the user's asset information, facilitating payments and/or refunds. There has been recent speculation that cellular telephones will assume functionality of credit cards, identification means, access means, and the like. This functionality certainly is adaptable to the presently disclosed system.

Advertising is another commercial application of the present invention. For example, a user captures a facial image of an advertisement in a magazine, on a poster, or on the screen of a television, transmits the advertising facial image to a database, and acquires additional information about the product, commodity, or service. The user may also be linked to the source site of the advertisement. Advertisements might be captured from pamphlets, flyers, newspapers, books, posters, magazines, newspapers, TV commercials, coupons, or the like. Alternatively, information about services involving matters of health, law, travel, insurance, and the like also may be acquired. For example, a person can "shoot" a movie poster or marquee containing faces to obtain reviews of a movie, times and places of showing, cost of tickets, information about the director and actors, and information about other movies that might appeal to the user. The user of the system can also purchase tickets.

Figure 10:
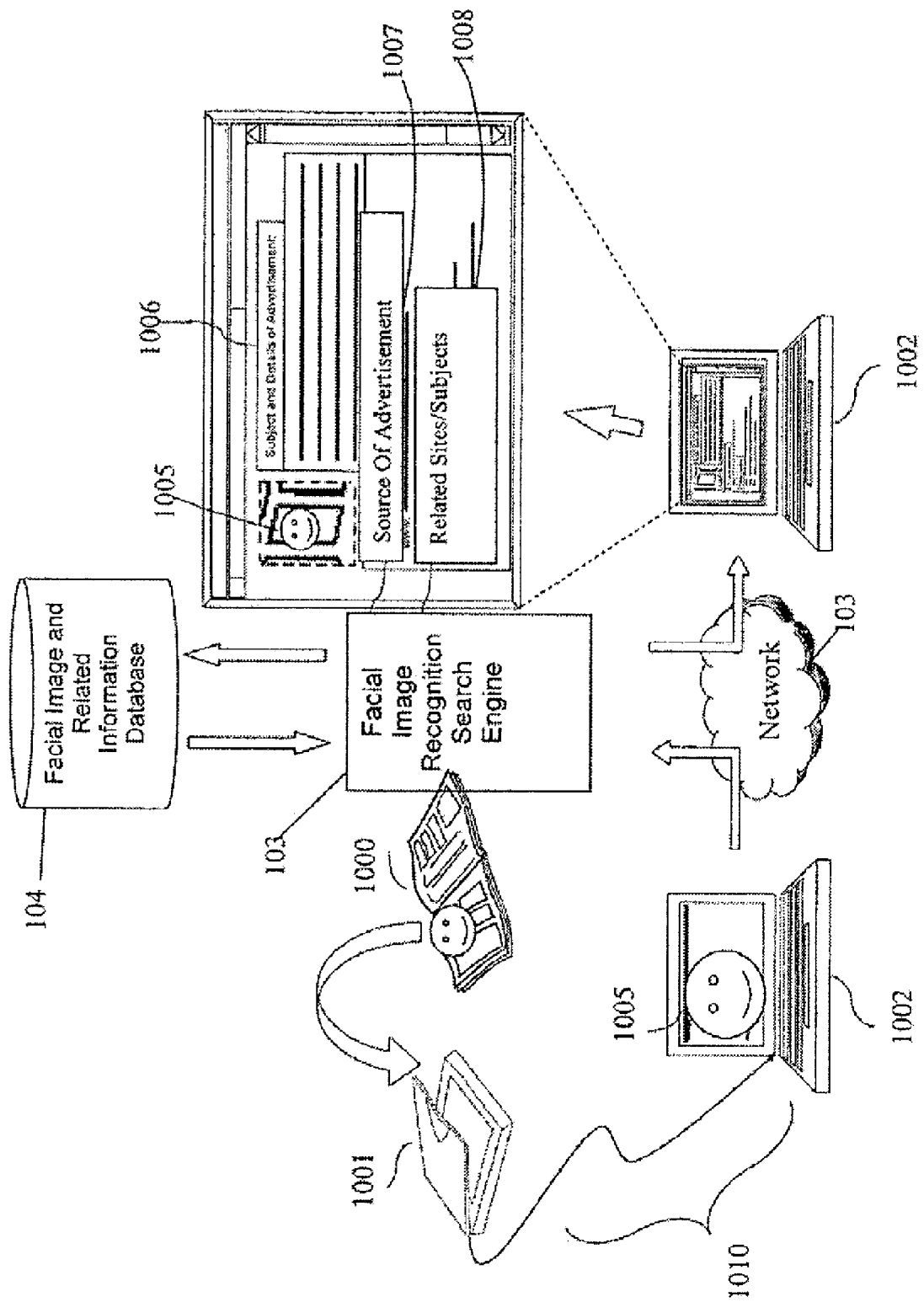
FIG. 10 depicts a practical use of the system of the present invention in the advertisement context, wherein a user utilizes a scanning device and a computer to scan an advertisement from a magazine and access further information about the facial images within the advertisement via a facial recognition processing of the advertisement image or images using the method of the present invention.

FIG. 10 shows an example of the aforementioned application. An advertisement in magazine 1000 is scanned into computer 1002 through scanner 1001, wherein scanner 1001 and computer 1002 comprise elements of a CI device 1010. The user highlights the particular advertisement containing a facial image 1005 of the magazine page for which additional information is desired.

Computer 1002 sends the facial image to facial image recognition search engine 103 which utilizes an associated advertising facial image database 104, where the image is processed and compared with facial images stored in the advertising facial image database 104. The system extracts information 1006 about advertisement 1005, such as a more detailed description. The system can also provide a link to the source site of information 1007 or directly take the user to the source site as the advertisement with facial image is entered into the search engine. This aids the user in finding contact or pricing information to purchase services or products. The system also offers a listing of related sites 1008 where the user might access similar categorized services.

Figure 11:
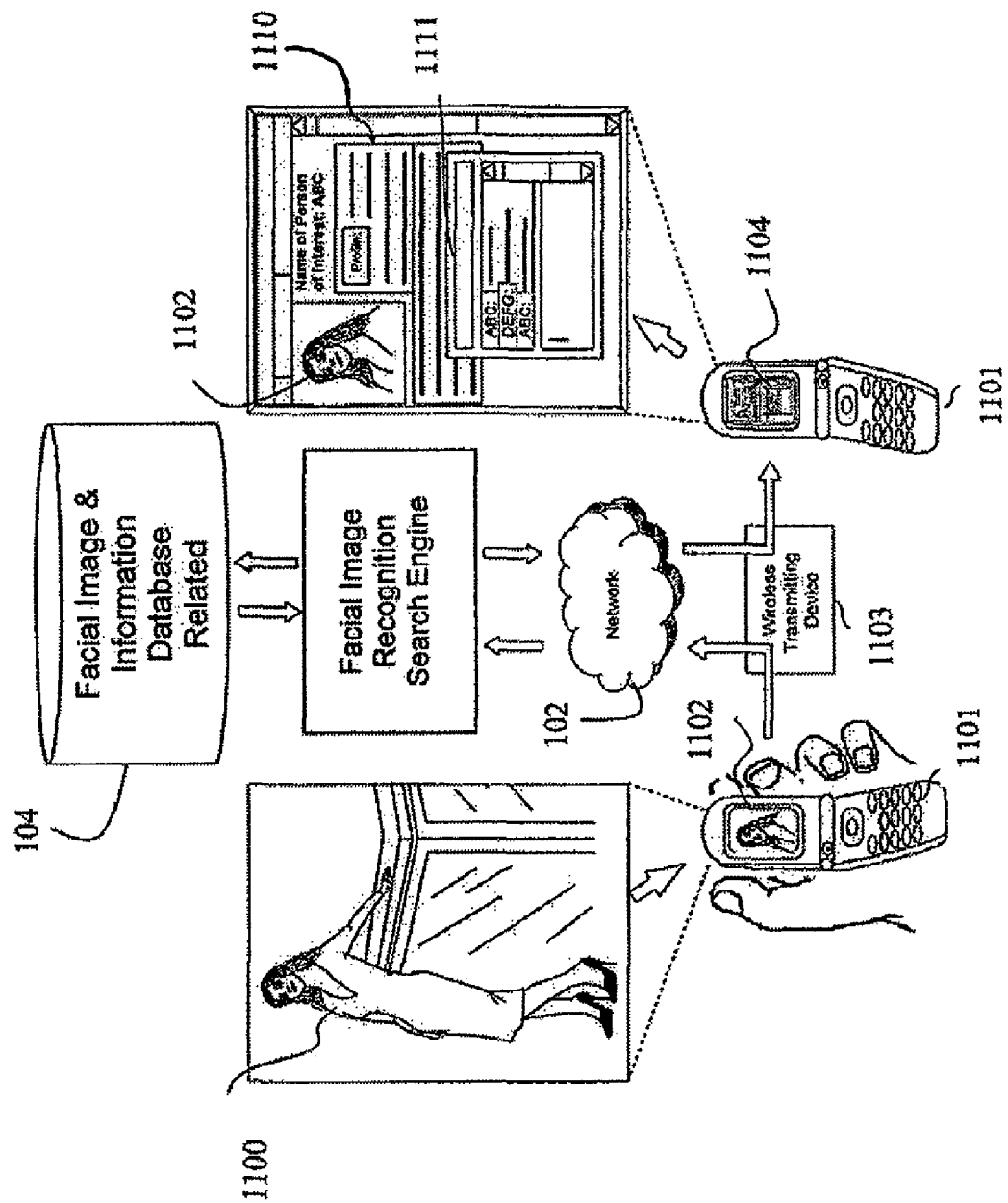
FIG. 11 depicts a use of the system of the present invention in the communication context for purpose of facilitating personal contact to one or plurality of personal parties of interest by the novel means of finding their celebrity look-a-likes and sharing them with the person of interest, wherein a user uses a camera enabled phone to capture an image of a person of interest and obtain images and related information about that person of interest's celebrity look-a-likes via the method of the present invention.

FIG. 11 provides an example of another application of the present invention involving sharing celebrity look-a-likes images and information with persons of interest to the user. Upon observing person of interest 1100, the user of the system uses CI device 1101, such as a cellular telephone having a camera, to acquire information about person of interest 1100 by capturing their image 1102. CI device 1101 sends the image to facial image recognition search engine 103 and an associated celebrity facial image database 104 by means of wireless transmitting device 1103 for processing of that image. The processing means associated with the facial image recognition search engine 103 and its associated celebrity facial image database 104 performs facial recognition or some other form of biometric recognition, identifies the best fit match celebrities, and extracts celebrity facial images along with associated information regarding the celebrities from the celebrity facial image database 104. The user of the system can then view the information on the display screen of CI device 1101. The facial image recognition search engine 103 and its associated celebrity facial image database 104 contain images linked to information regarding the celebrity in the image. Upon extracting information, the system sends a web link to CI device 1101, or it downloads the information onto CI device 1101. The individual celebrities' information can be as extensive as the user chooses, depending on system applications such as personal interests, professional interest, medical history, criminal history, commercial preferences, or other similar information. The information can be entered in profile form 1110 by the celebrity or press and can consist of the celebrities' name, screen name, description, text information, visual features, personal traits, demographic characteristics, additional photographs, audio clips, video clips, or the like. However, due to security and/or privacy issues, after the user captures an image and desires to extract further information about the celebrity best-fit match to a person of interest, the system notifies the celebrity or requests permission to allow the user of the system to access the celebrities' data. As well, any person celebrity or not may choose not to publicly post information to ensure his or her privacy. In this case, the user of the system is unable to extract any information other than publicly available information.

The system need not be used only in the Internet context. Various organizations can use the system to identify people or acquire important information. The associated facial image database could be maintained by the organizations and contain data such as the image representation of an individual and their desired descriptions. In the medical field instance the associated facial image database can be maintained by medical facilities and entered by medical personals as the individuals' medical records change. For example, individuals having a chronic illness may contain information identifying their illness and ways of assisting such an individual. In the instance that they have a recurrence, anyone authorized to access the system, such as medical personnel, may capture their image and acquire password protected medical information about the affected person through available wireless Internet based device. This would provide a more secure environment for the sickly, elderly, or the like.

Figure 12:
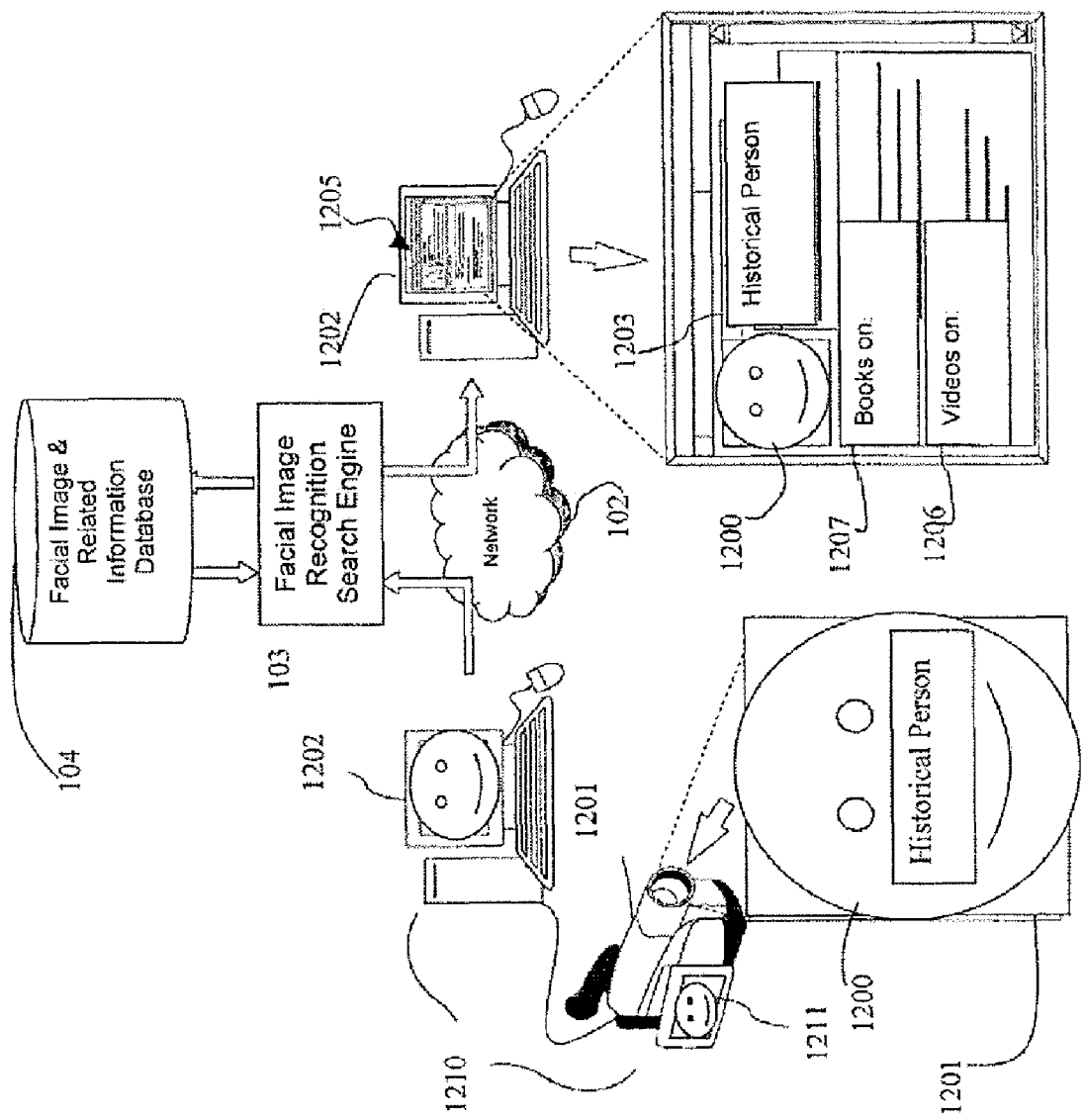
FIG. 12 depicts a use of the system of the present invention in the education context, wherein a user uses a video camera and a computer in order to acquire educational information about a person depicted in a captured video via the method of the present invention.

The present invention also has great potential for the field of education. The present invention provides a system and method for accessing information regarding any facial image of question. The source of information retrieved can be books, dictionaries, encyclopedias, articles, news, Web, or the like. FIG. 12 illustrates a means for accessing educational information in which a user of the system captures a facial image of a historical FIG. 1200 and enters it into computer 1202 through the computer's connection with video camera 1201 that together can be considered a CI device 1210. The facial image is entered into facial image recognition search engine 103 through network 102 and is processed in order for best-fit matches to be found in database 104. A formatted reply 1205 listing of best-fit matches and related information may then be transmitted back to the CI device 1210 and displayed on display unit 1205 or 1211 associated with the CI device 1210. The shown formatted reply 1350 is comprised of the original input facial image 1200, description and information 1203, books on 1207, and videos on 1206 all related to the historical figure.

Further the invention's graphic features and linking supports comparisons and contrasts of the similar images. For example, a superimposed time-sequence of a patients daily facial health images fading into each successive day's facial images for health monitoring and diagnostic aiding (especially useful with facial plastic surgery patients); a superimposed time-sequence of a woman's daily facial makeup images fading into each successive day's facial images to enable consistent or experimental application techniques; semi-transparent video of an cosmetic expert make-over artist doing the users makeup shown semi-transparently with the users own real-time image also shown semi-transparently and the two superimposed so that the user can user the artists application as a ghostly guide to her mimicking the makeup application processes.

Returning to our medical context, currently captured facial images linked to other "best-fit" matching stored facial images enables entirely new classes of innovative medical monitoring and diagnostics by processing images for standard formats and display positioning along with time sequenced visualization of similar facial images periodically captured from a specific patient. The visualization includes but is not limited to: opaque, semi-transparent, fading, morphing, blinking, overlapping, mirroring, adjacent, superimposing, time-sequencing, warping, distorting, scaling, coloring, highlighting, and grouping said facial images. Examples: color tone monitoring could automate detection of yellowing skin in jaundice; convenient doctor patient reviews with the time lapse images showing at a glance what is now all mental workload, stress, and memory burdens for busy doctors making rounds regarding patients' weight loss or gain from facial changes, skin color, redness of the eyes, dark circles under the eyes, over days, etc. This object is particularly useful in the context of the expanding home care and remote telemedicine fields. Combined with automated control of the capture camera, and light levels in the room this object can provide entirely new classes of non invasive and extremely accurate new medical tools. Further objects and advantages are the use of automated means to read and record the universal emotions from patients' faces utilizing the Facial Action Coding System. A patient's morale and emotional state are so important to their recovery, so this automated means can be utilized to judge and help the patients in such a manner.

The system can also be used in a secure environment such as, but not limited to a prison, airport, secret agencies, army, hospital, and the like. In these applications, the individual's information includes criminal, immigration, medical records, or the like. Anyone that has access to the system can enter the information about the person of interest into the system. The authorized person can access this personal information via a password or the like. The information can be used to run background checks, to identify individuals in need of help, to find missing individuals, or the like.

The system can be used as a child-loss-prevention system wherein parents or school officials may enter the child's photograph along with identifying information. The identifying information may include the child's name, names and contact information of parents or school officials, and/or the address of the family's residence. For instance, if a user of the system finds a lost child, that user can use the CI device to capture a photograph of the child and acquire the identifying information regarding the child.

Figure 13:
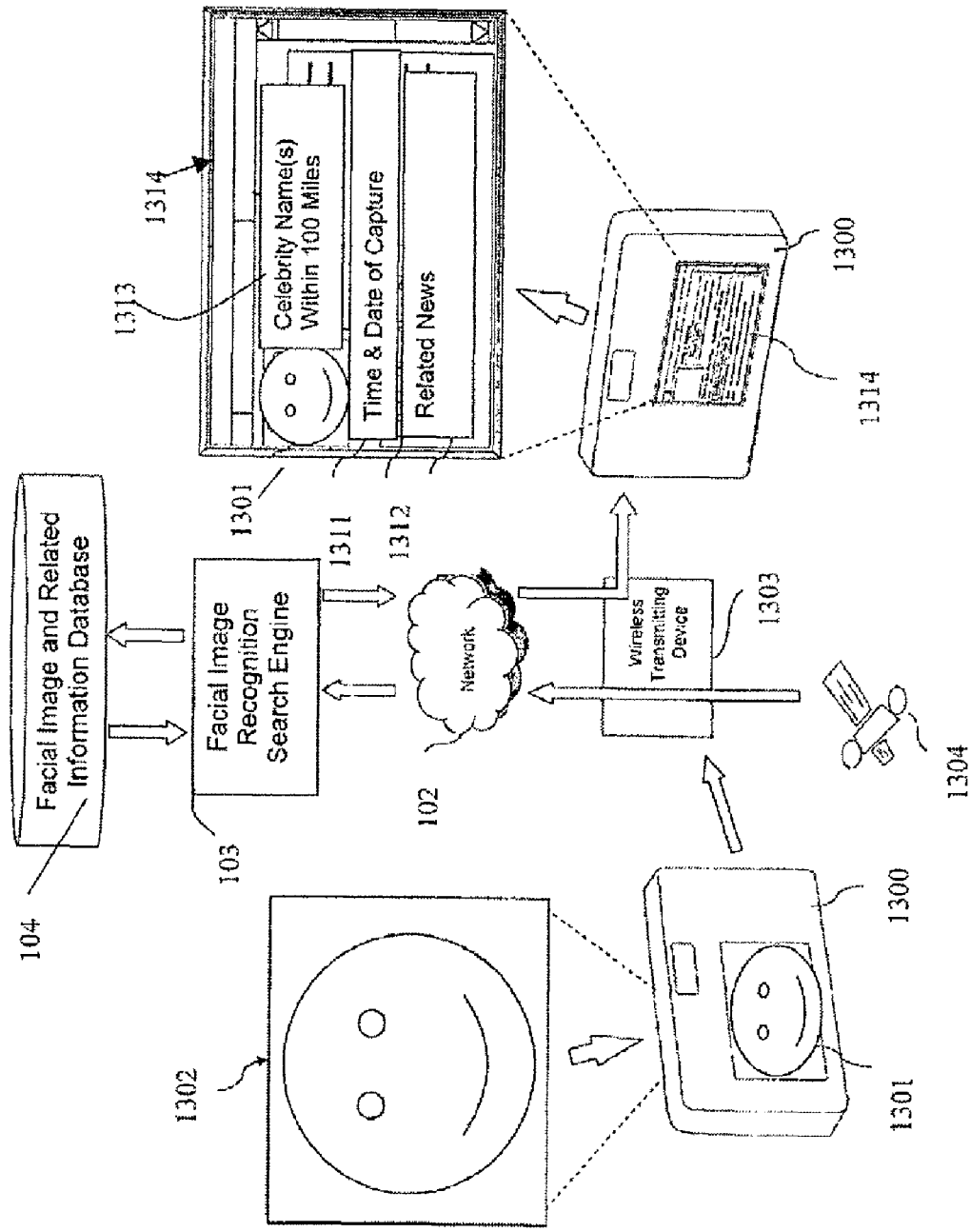
FIG. 13 depicts a use of the system of the present invention in the tourist context, wherein a tourist uses a GPS and web-enabled digital camera to capture a celebrity image and to acquire addition images and information about that celebrity via the method of the present invention.

FIG. 13 depicts a use of the system of the present invention in the tourist context, wherein a tourist uses a GPS and web-enabled digital camera 1300 to capture a celebrity image 1301 and to acquire addition images and information about that celebrity via the method of the present invention. Specifically, a local poster or picture of a local celebrity 1302 hanging on the wall of a pub is imaged utilizing a digital camera 1300 with built-in GPS to capture a digital image 1301 and annotates it with GPS location, date and time data received, and calculated from the constellation of GPS satellites 1304; transmitted to a wireless transmitting device 1303 which in turn utilizes the network 102 to transmit the captured image 1301 and the GPS location, date and time information as search narrowing parameters to the facial image recognition search engine 103, which in turn accesses the facial image and related information database 104 for the "best-fit" matches which are returned along with the related information through the network 102 back to the wireless transmitting device to the digital camera 1300 with the original image 1301 embedded within a formatted reply 1314. The depiction also includes a blow up of formatted reply 1314 which includes the original captured image 1301, Celebrity names that live within 100 miles 1310, the time, date and location of image capture 1311, and related news 1313. 1305 illustrates digital cameras that have both GPS and wireless communication features.

Figure 14:
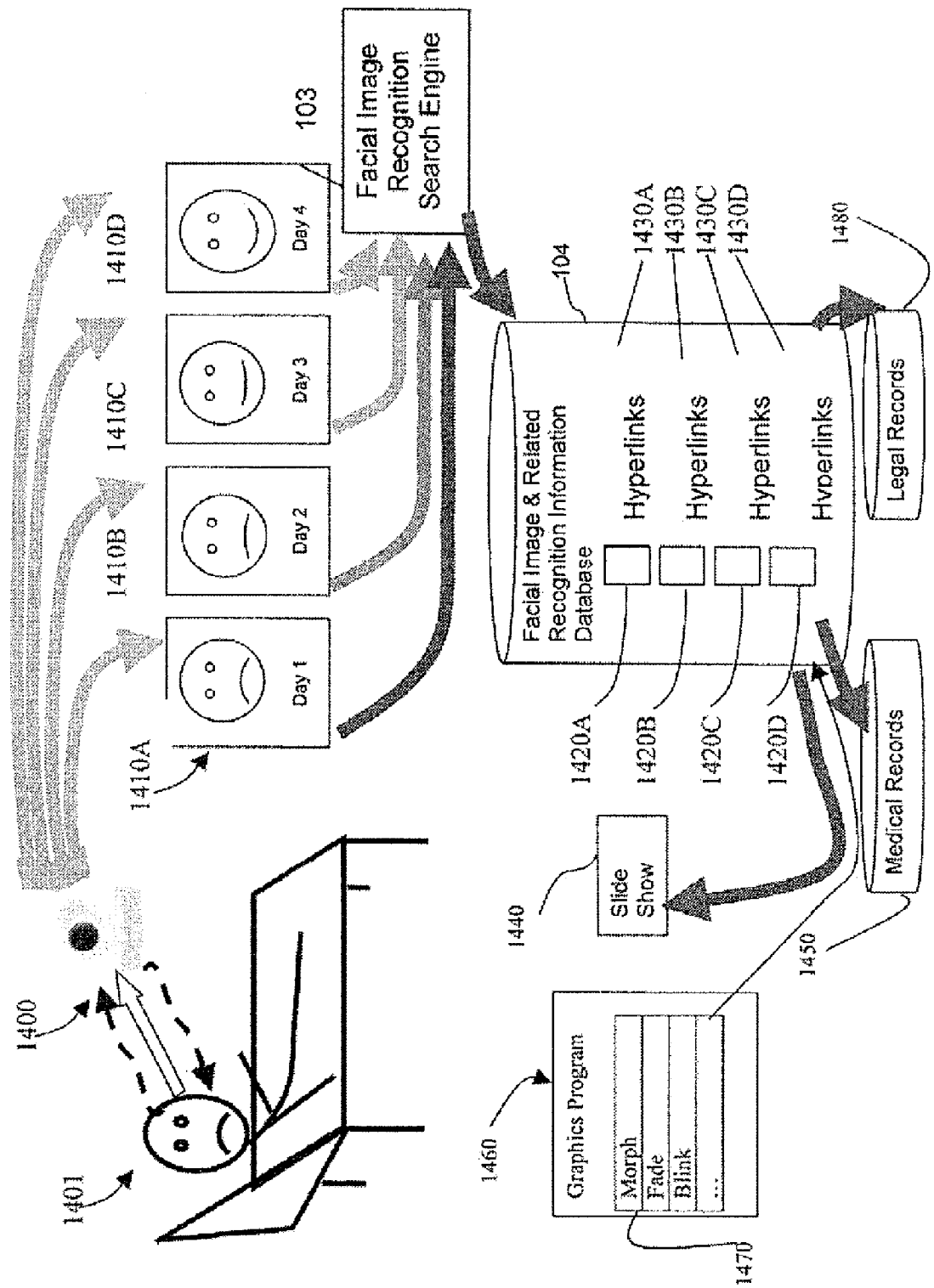
FIG. 14 depicts a use of the system of the present invention in the innovative medical monitoring and diagnostics context, enabled by processing multiple similar images for standard formats and display positioning along with time sequenced visualization of similar facial images periodically captured from a specific patient. The visualization includes but is not limited to: opaque, semi-transparent, fading, morphing, blinking, overlapping, mirroring, adjacent, superimposing, time-sequencing, warping, distorting, scaling, coloring, highlighting, and grouping said facial images. Examples: color tone monitoring could automate detection of yellowing skin in jaundice; convenient doctor patient reviews with the time lapse images showing at a glance what is now all workload and memory burdens for busy doctors making rounds; weight loss or gain from facial changes over days, etc. This object is particularly useful in the context of the expanding home care and remote telemedicine fields. Combined with automated control of the capture camera, and light levels in the room this object can provide entirely new classes of non invasive and extremely accurate new medical tools.
Figure 15:
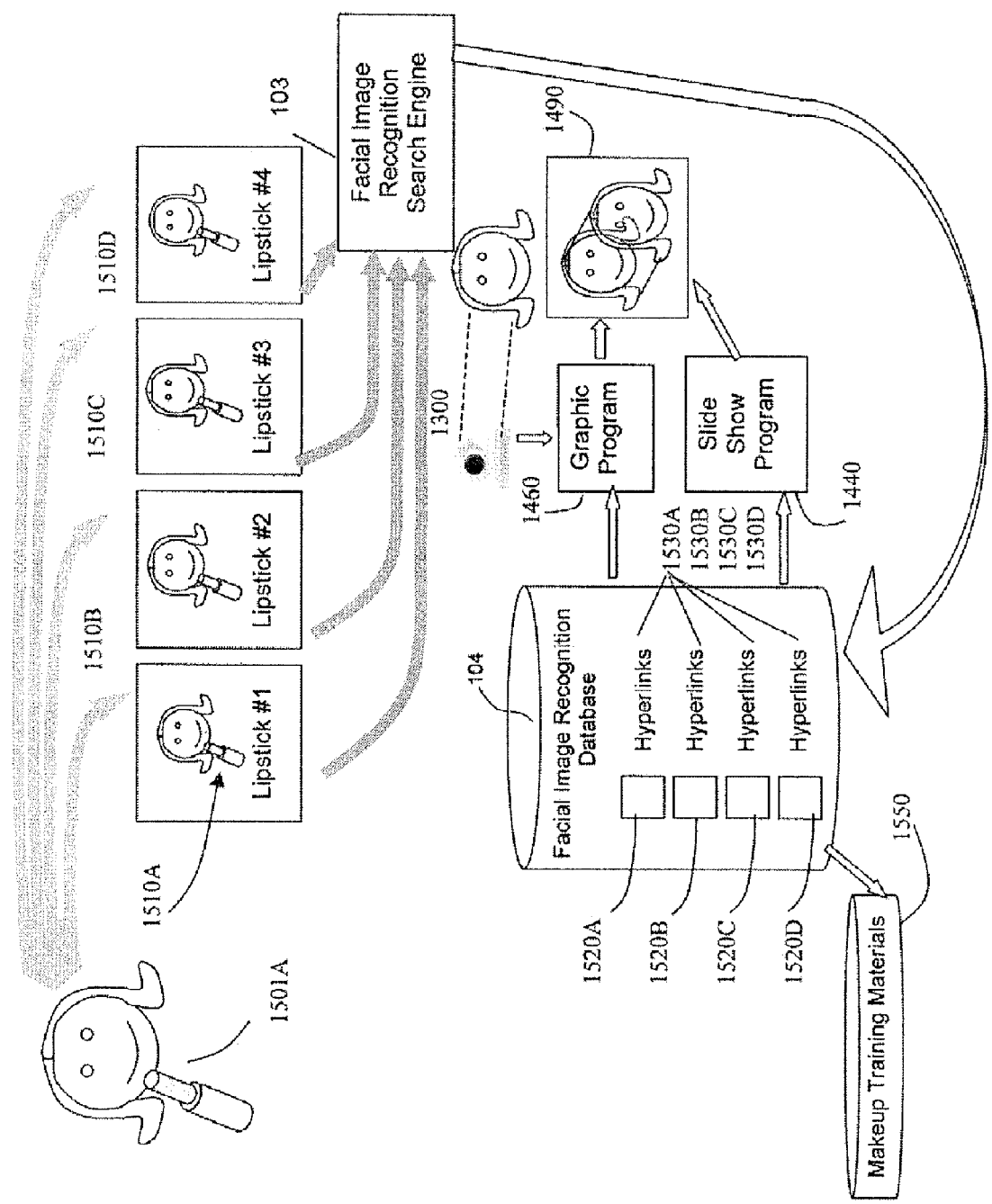
FIG. 15 depicts a use of the system of the present invention in the facial related training context, which enables innovative uses of the returned similar facial images for semi-transparent superimposed display of the user's facial image within sequences of similar facial images to train cosmetic application, facial expression mimicking, etc.

FIG. 14 depicts a use of the system of the present invention in the innovative medical monitoring and diagnostics context, enabled by processing multiple similar images for standard formats and display positioning along with time sequenced visualization of similar facial images periodically captured from a specific patient. The visualization includes but is not limited to: opaque, semi-transparent, fading, morphing, blinking, overlapping, mirroring, adjacent, superimposing, time-sequencing, warping, distorting, scaling, coloring, highlighting, and grouping said facial images. Examples: color tone monitoring could automate detection of yellowing skin in jaundice; convenient doctor patient reviews with the time lapse images showing at a glance what is now all workload and memory burdens for busy doctors making rounds; weight loss or gain from facial changes over days, etc. This object is particularly useful in the context of the expanding medical home care, care for the elderly and infirm, and remote telemedicine fields. Combined with automated control of the capture camera, and light levels in the room this object can provide entirely new classes of non invasive and extremely accurate new medical tools. Web camera 1400 captures daily images 1410a through 1410d of the patient 1401, each image which are taken at slightly different ranges, angles, and orientations. Input of these daily images into the facial image recognition search engine 103 which then utilizes embedded image processing features to correct the positions of the faces to be reasonably consistent, typically with baseline eye positions calibration. The processed images 1420a through 1420d are stored to the associated facial images database 104 or other database. Further, the facial image recognition search engine 103 can annotate the associated information with each stored image with hyper links 1430A to 1430D to the other associated images. Any of the readily available slide show programs 1440 can then play back the linked images to enable doctors and medical staff to conveniently monitor facial health of each patient. Such linked images can also be utilized for medical records 1450 and legal records 1480. Further, as described above, special processing built-in features to slide show programs 1440 or graphic programs 1460 can utilize the linked facial images with myriad special effects as shown on special effects menu selections 1470. Facial comparison calculations are also implicit uses of such linked files. Examples: color tone monitoring could automate detection of yellowing skin in jaundice; convenient doctor patient reviews with the time lapse images showing at a glance what is now all workload and memory burdens for busy doctors making rounds; weight loss or gain from facial changes over days, etc. This object is particularly useful in the context of the expanding home care and remote telemedicine fields. Combined with automated control of the capture camera, and light levels in the room this object can provide entirely new classes of non invasive and extremely accurate new medical tools FIG. 15 depicts a use of the system of the present invention in the facial related training context, which enables innovative uses of the returned similar facial images for semi-transparent superimposed display of the user's facial image within sequences of similar facial images to train cosmetic application, facial expression mimicking, etc; Web camera 1300 (not shown) captures multiple images 1510a through 1510d of a celebrity 1501A applying her makeup for a show which are taken at slightly different ranges, angles, and orientations. Input of these daily images into the facial image recognition search engine 103 which utilizes embedded image processing features to correct the positions of the faces to be reasonably consist, typically eye positions calibration. The processed image 1520a through 1520d are stored to the associated facial images database 104 or other database. Further, the facial image recognition search engine 103 can annotate the associated information with each stored image with hyper links 1530A to 1530D to the other associated images. Any of the readily available slide show programs 1340 can then play back the linked images to enable user to conveniently view the celebrity applying her makeup as a semi-transparent image. Further, through clever use of a web camera 1400 to provide a real-time opaque background beneath the semi-transparent images 1425a through 1425d (not shown) internal semi-transparent versions of 1520a through 1520d with the graphics program 1460 or within the slide show program 1440) the user can use the semi-transparent celebrity images as superimposed overlay guides to apply make up to her own face in display 1490. Such linked images can also be utilized for make-up training materials 1550 and diary type records (not shown). Further, as described above, special processing built-in to slide show programs 1440 or graphic programs 1460 can utilize the linked facial images with myriad special effects as shown on menu selections 1370 in the prior FIG. 13. Facial comparison calculations are also implicit uses of such linked files. Our method wherein the said linking of said captured images to said matched similar facial images and linked electronic data; and presenting said electronic data on a display unit with display processing that is at least one selected from the group consisting of opaque, semi-transparent, fading, morphing, blinking, overlapping, mirroring, adjacent, superimposing, time-sequencing, warping, distorting, scaling, coloring, highlighting, and grouping said facial images.

Figure 16:
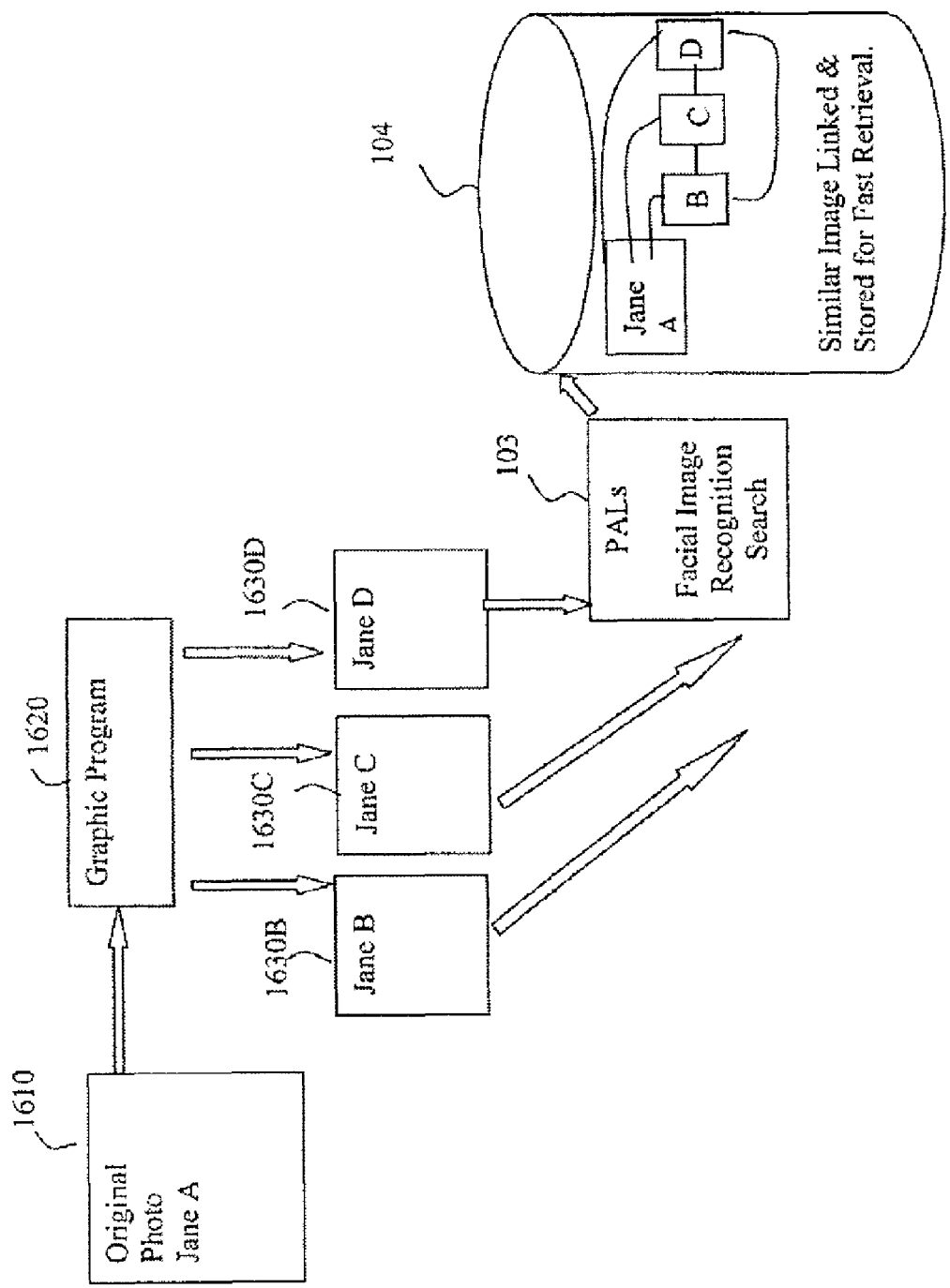
FIG. 16 depicts a use of the system of the present invention in the information technology context, which enables innovative and intuitive automatic linking of similar facial images for enhanced and improved organization, classification, and fast retrieval objects and advantages.

Beyond training cosmetic applications, the invention system enables innovative uses of the returned similar facial images for semi-transparent superimposed display of the user's facial image within sequences of similar facial images to train facial expression mimicking, facial action coding system (FACS) expression training (which have an involuntary feedback emotional affects which can also lead to superior training results), etc;

FIG. 16 depicts a use of the system of the present invention in the information technology context, which enables innovative and intuitive automatic linking of similar facial images for enhanced and improved organization, classification, and fast retrieval objects and advantages. An original digital image 1610 is entered into a commercial graphics program 1620; which modifies the original image 1610 into three different derivative images 1630a, 1630b, and 1630c. Such derived images typically become a file naming nightmare, and has been a long standing intractable configuration problem for graphic artists and others. By inputting the original image 1610 and the three derived images 1630a, 1630b, and 1630c into the present invention, the facial image recognition search engine 103 can return similar matched images or it can store all four new images into the associated facial images and related information database 104 along with automatic links between them. Future input of any of the four images into the invention will rapidly return all four linked images. This invention process is far superior to current kludges that rely on naming conventions. Further, the Boolean and Boundary search refinements described previously can be used to optimize such fast linked retrievals. The links can be database indexes, hyper links in the related information for each image, etc. The key objects are rapid automatic linking of similar images, plus the fast retrieval of such linked similar images vs. the current slow awkward file naming conventions and associated text linking. To further increase the efficiency and speed of such image and information retrievals a captured image or interest and it's returned similar images can be linked, saved, and reused by the user or others. Specifically, if a commercial ad facial image is anticipated to generate good advertising traffic, the matched images can be pre-recorded and used from a cache, or placed near the front of the facial image database to be searched.

Figure 17:
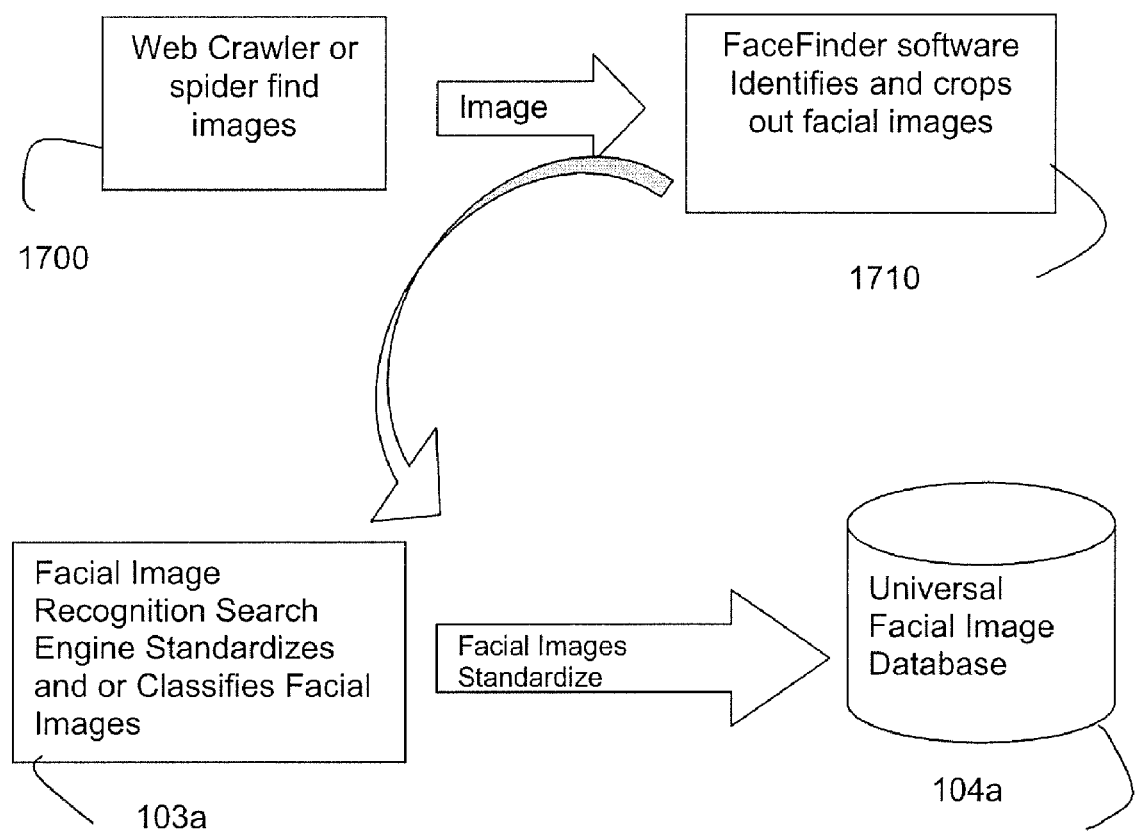
FIG. 17 depicts another use of the system of the present invention in the information technology context, which utilizes web-crawlers or spiders to explore the web and exploit facial images contained in web pages and files to provide universal facial image database for facial image based enhanced and improved organization, classification, and fast retrieval objects and advantages.

FIG. 17 is a flow chart which depicts a method and new use of a facial image recognition search engine utilized with web-crawlers or spiders means to examine the web for image information and to seek facial images, recognize, index, and/or link the Webs images containing faces for "key-face" searches to replace or at least augment the current key word search methodologies. Our invention includes running programs web-crawlers or spiders that continuously explore the Internet and, often, USENET news groups, with processing by the face finder and facial image recognition software they index the facial image information on websites that the web-crawlers or spiders encounter. Indexing forms a vast database of website addresses that are associated with the facial images that have been found on the websites themselves. These facial images can be utilized as key-faces analogously to current key-words for both indexing and searching. Further, both key-face and key-word indexing and searching can be combined for new improved methods of indexing and searching that provide enhanced features and easy of use for users.

Figure 18:
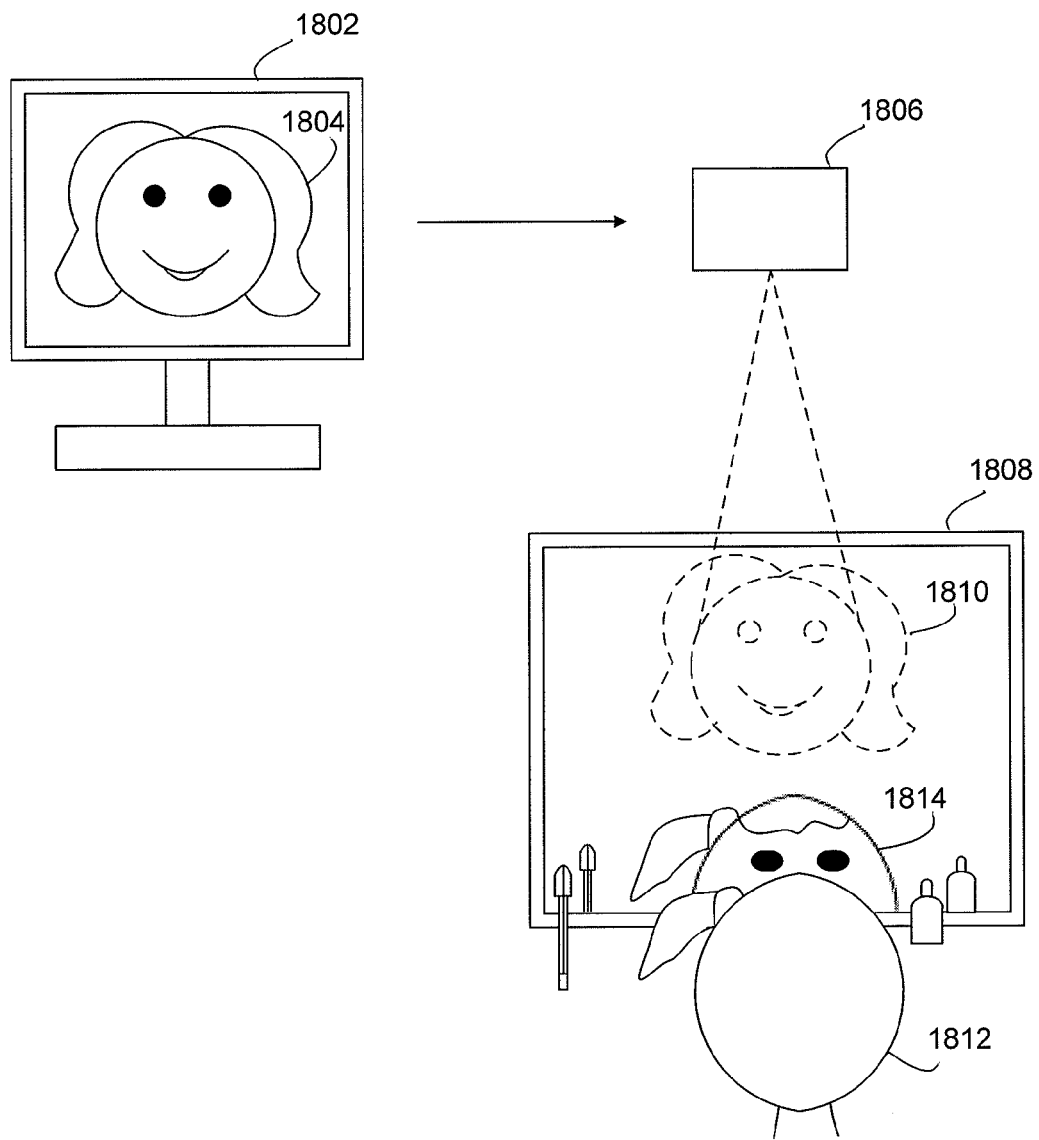
FIG. 18 shows an alternate embodiment of the invention where a computer transmits an image to a projector.

FIG. 18 shows an alternate embodiment of the invention where a computer 1802 transmits an image 1804 to a projector 1806. The projector 1806 projects the image 1804 onto the back side of a semi transparent mirror 1808. The image 1804 is visible on the front side as a visible image 1810. A user 1812 can use the semi transparent mirror 1808 to see a user's reflected image 1814. The user 1812 can then adjust position to place the user's reflected image 1814 over the visible image 1810. At this point the user 1812 can use the visible image 1810 as a tool to assist the user 1812 in mimicking the visible image 1810, thereby mimicking image 1804.

This method and new use would produce a universal facial database across the web where entering an image containing faces, would return all the similar faces across the entire Web (or at least the percentage of the Web currently crawled and updated). To further increase the efficiency and speed of such image and information retrievals a captured image or interest and it's returned similar images can be linked, saved, and reused by the user or others. Specifically, if a commercial ad facial image is anticipated to generate good advertising traffic, the matched images can be pre-recorded and used from a cache, or placed near the front of the facial image database to be searched.

Specifically, the Web Crawler or Spider Finds Images process 1700 examines each web page, USENET newsgroups, and other web locations for images. Image that are found are transferred to process 1710 Face Finder software which identifies and crops out facial images. These facial images are in turn transferred to process 103A Facial Image Recognition Search Engine which standardizes and/or classifies facial images, which in turn are transferred to the Universal Facial Image Database 104A. Such a database provides the basis for many additional uses of the system of the present invention in the information technology context. These additional new uses include exploring the web and exploiting facial images contained in web pages and files to provide universal facial image database for facial image based enhanced and improved organization, classification, and fast retrieval objects and advantages.

CONCLUSION, RAMIFICATIONS, AND SCOPE

While the above description contains many specificities, these should not be construed as limitations on the scope of the invention, but as exemplifications of the presently preferred embodiments thereof. Many other ramifications and variations are possible with the teachings of the invention. For example:

A powerful laptop or PDA could be an embodiment of the invention where the capture means, directly inputs to the facial image recognition search engine which access the onboard disk facial images and related information database, and displays the matched facial images and their related information on the built-in screen. That is, an embodiment that can run on a single hardware platform, provided it has input means for images, and sufficient computational resources to run the facial image recognition search engine and its associated facial images and related information database software to store, or display the resultant best-fit matched images and their related information. Further, the invention can automatically link the similar images for improved access as a more intuitive image input to rapidly retrieve similar images. For example, a Human worn web camera on such a device could automatically capture facial images throughout the day, index them with location, date and time information of past encounters and provide this history with any other user added or web search found annotations on a display to the user upon encounters or upon requests.

Another embodiment of the invention is a facial image recognition search engine utilized with Web crawler information to seek facial images, recognize, index, and/or link the Webs images containing faces for "key-face" searches to replace or at least augment the current key word search methodologies. Entering an image containing faces, in this embodiment would return all the similar faces across the entire Web (or at least the percentage of the Web currently crawled and updated). To further increase the efficiency and speed of image and information retrievals a captured image and returned similar images can be linked, saved, and reused by the user or others. Specifically, if an ad image is anticipated to generate good advertising traffic, the matched images can be pre-recorded and used from a cache, or placed near the front of the facial image database to be searched.

Another embodiment of the invention is to utilize the "key face" processes as indexes for classifications that support and exploit Human classification and retrieval processes, especially multiple contexts. For example: George Washington's facial image, would retrieve the facial image categories of United States Presidents, Generals, Revolutionary War Heroes, etc., along with their related information.

The facial image recognition search engine described can be any one of several commercial facial recognition software programs that are currently available. However, a simplified version of the facial image recognition search engine can be simple face matching algorithms for positioning multiple images on the same part of the display screen for the time-lapse applications already mentioned for medical, training and organization new uses.

The system and method of the invention searches for and processes focused on obtaining "best-fit" matching images for "key-face" or similar images. It is important to note that many of the commercial applications described above for our invention purposefully do not strive for a single exact match, instead opting for the more practical approximate "best-fit" matching methodology. Much of the prior art teaches towards a single match, and again our invention teaches away from the prior art in that several of our commercial applications rely on returning multiple similar images and related information. Further, contradicting the prior art, many of our competitors claim to do, or are striving to obtain exact matches of input image to reference stored images. Our invention's embodiments do not in any way rely on, nor waste the computational resources trying to obtain exact matches. In fact, our commercial new use of utilizing celebrities as facial image keys linked as look-a-likes to user input facial image relies on NOT obtaining exact matches Another embodiment of the invention includes post-processing module support of the linked images including special effects, time-lapse, and other visualization effective features such as opaque, semi-transparent, fading, morphing, blinking, overlapping, mirroring, adjacent, superimposing, time-sequencing, warping, distorting, scaling, coloring, highlighting, and grouping said facial images. These graphic features support comparisons and contrasts of the similar images. For example, a superimposed time-sequence of a patients daily facial health images fading into each successive day's facial images for health monitoring and diagnostic aiding (especially useful with facial plastic surgery patients); a superimposed time-sequence of a woman's daily facial makeup images fading into each successive day's facial images to enable consistent or experimental application techniques; semi-transparent video of an cosmetic expert makeover artist doing the users makeup shown semi-transparently with the users own real-time image also shown semi-transparently and the two superimposed so that the user can user the artists application as a ghostly guide to her mimicking the makeup application processes.

Another embodiment of the invention can utilize animal faces to identify types, with minor modifications to the facial recognition software. Modification for any two eyed face is very simple, however small insects with multiple eyes are problematic and would require new algorithms to approach the success level of the current facial recognition with Humans.

Another embodiment of the invention enables automatic linking of images taken simultaneously from two or more cameras or video sources, such in stereo-pairs, hyper-stereo pairs, or even extremely long baseline ultra-stereo pairs which can not be fused by the Human brain, but still useful for such applications as long range 3D Facial Recognition, ranging, targeting, etc. For example, using face finder software on each of two separate images from two separate cameras looking at approximately the same field of view, the facial image matching software only has to compare the faces within the two separate images to determine matches, and armed with the specific image locations correlated to the current cameras position and orientation settings, aiming and telescopic magnification commands can be issued within the device for high magnification dual image captures of the detected faces, for higher reliability 2D and/or 3D facial recognition. Similarly, the inventions automatic linking can also drive weapons. Returning to the prior example, not only telescopic lens can be accurately pointed, but weapons with lasers that then display laser dots on the target. If the face in the image is not wearing the right type of helmet, the weapon safety can be turned off, etc.

Another embodiment of the invention eliminates the need for a capture device 100 by having the user directly enter the file path to the input image, copy and paste, drag and drop, or any other method of input. The embodiments shown in FIGS. 2A and 2B show elimination of the capture device and the input by user entry of the image file path and name into 290.

Another embodiment of the invention eliminates the need for a CI device 101 by having the user direct entry of the file path to the input image, copy and paste, drag and drop, or any other method of input, plus having the entire invention run on that device so that no network 102 is required either in this minimalist embodiment of the invention.

Other embodiments can purposefully strive for opposite effects, such as a user enters their own image and the facial image recognition search engine is reconfigured to return the worst match fit images and related information. Such utilization may have gag or fad value, for users to submit friends' facial images and be returned with the celebrities most unlike the submitted friends' images. For example, submission of a young male friends image with the select of female and over 60 age restrictions may return humorous results.

Another embodiment enables reverse methods of tracking products, services and even points of sale (stores, brands, on-line web sites, etc) of interest to the celebrities that endorse, market, and/or advertises them. The business model is unique in it enables consumers to select between products based upon finding out which celebrities, or at least what type of celebrities are promoting a specific product. For example, a progressive young man may prefer to purchase products and services endorsed by celebrities within his age group and that reflect his evolving tastes, rather than products and services promoted by celebrities he dislikes.

Another embodiment of the invention enables tracking of number of times facial image access leads to sales driven by a celebrity, actor, or model facial image. In addition to supporting business models which are derived from such tracking of performance, this embodiment enables charitable contributions to be automated as well. For example, with proper approvals and contracts a Celebrity facial image driven purchase though our invention, could qualify such users for a 10% discount, and automatically donate 10% of the remaining sale price to the celebrities' charities of choice. Users that utilize our invention would feel closer to their selected celebrities and the power of social networks and popular culture are harnessed for charitable good, with celebrity and user working together with every purchase to make the world a better place.

Other embodiments of the invention evolve beyond the facial image recognition to include other new types of biometric identification of images for recognition purposes. An extremely useful version is to rapidly recognize and return similar DNA sequences or Key-Genes. Given the repetitiveness of the Human Genome DNA visualization and automated linking may provide new levels and new types of applications.

Thus the scope of the invention should be determined by the appended claims and their legal equivalents, and not by the examples given.

I claim:

1. A system for accessing multiple similar key-face images and associated electronic data by providing an image containing a face, the system comprising:
    a means for capturing an image containing a face;
    a means for transmitting said image to a facial image recognition search engine to find images of different faces with "best-fit" matching facial images, wherein the engine comprises:
        a means to receive said image;
        a means of extracting a facial image from the captured image,
        a web crawler or spider configured to seek said "best-fit" matching facial images disposed on the internet;
        a means to access said facial image's "best-fit" matching facial images and associated electronic data with each "best-fit" image;
    a means to transmit said "best-fit" matching facial images and associated data to a display unit;
    a mirror imaging device comprising a projected semi-transparent mirror with a back and a reflective front configured to superimpose at least one "best-fit" image on an other facial image, wherein at least one of the images is semi-transparent such that both can be seen superimposed simultaneously;
    wherein at least one "best-fit" match is projected onto the back and is visible from the front, and wherein an operator can see both the operator's reflection and the at least one "best-fit" match simultaneously on the front, thereby enabling the operator to mimic the at least one "best-fit" match.

2. A system according to claim 1 wherein said image containing a face is captured from at least one selected from the group consisting of visual entity, sensor entity, printed material, electronic display unit, electronic message packets, and projected visual information.

3. A system according to claim 1 wherein said means for capturing an image containing a face is at least one selected from the group consisting of camera, scanner, sensor, frame-buffer utilities, network utilities, and Computer Input Devices.

4. A system according to claim 1 wherein said means for capturing an image and means for transmitting said image to a facial image recognition search engine or to a database comprise a Communicable-Imaging Device.

5. A system according to claim 4 wherein said Communicable-Imaging device comprises processing means which perform facial image recognition search engine and facial matching functions to process said captured image.

6. A system according to claim 1 wherein said display unit comprises display processing that is at least one selected from the group consisting of opaque, semi-transparent, fading, morphing, blinking, overlapping, mirroring, adjacent, superimposing, time-sequencing, warping, distorting, scaling, coloring, highlighting, and grouping said facial images.

7. A system according to claim 1 wherein said facial image recognition search engine comprises processing means which perform facial image recognition functions and facial matching functions to process said captured image.

8. A system according to claim 1 wherein Boolean expressions are used with narrowing parameters in a search of the associated electronic data to narrow said matching process.

9. A system according to claim 8 wherein narrowing parameters are at least one selected from the group consisting of search category, alphanumeric boundaries, textual description, strings, wildcards, time, and location.

10. A system according to claim 1 wherein related information found on the internet about said associated data is presented on the display.

11. A system according to claim 1 wherein a hyperlink to a source of the related information is displayed.

12. A system according to claim 1, wherein the other facial image is the facial image from the captured image.

13. A system according to claim 1, wherein the other facial image is an operator's facial image in real time video.

14. A system according to claim 1, wherein the other facial image is a second image of the operator captured subsequent to transmission of the "best-fit" facial image to the display.

15. A system according to claim 14, wherein the at least one "best-fit" facial image is scaled to match a size of the operator's reflection.

16. The system according to claim 1, further comprises a means to scale at least one of one of said "best-fit" matching images and a feature within the at least one of said "best-fit" matching images to match a scale of an other, independent facial image.

17. The system according to claim 1, wherein the facial image further comprises at least one of other body parts, and other objects.

18. A method of extracting similar images and electronic data from a database by providing an facial image captured by capturing means, wherein said method comprises:
providing computer coded facial images stored on the database and further linked to electronic data;
entering a captured image of a face not stored on the database;
performing facial image recognition functions for "best-fit" matching of said captured image to said computer coded images stored on the database;
linking said captured images to said "best-fit" matched similar facial images and linked electronic data;
displaying the "best-fit" matched facial images on the display unit; and
displaying a real time image of an operator's face on the display unit, thereby enabling the operator to generate a mirror image of the "best-fit" facial image on the operator's face with a mirror imaging device comprising a projected semi-transparent mirror with a back and a reflective front configured to superimpose at least one "best-fit" image on the real time image of the operator's face wherein at least one of the images is semi-transparent such that both can be seen superimposed simultaneously and at least one "best-fit" match is projected onto the back and is visible from the front, and wherein an operator can see both the operator's reflection and the at least one "best-fit" match simultaneously on the front, thereby enabling the operator to mimic the at least one "best-fit" match.

19. The method of claim 18, wherein the real time image of the operator on the display is superimposed on at least one "best-fit" match such that the operator can see both images simultaneously.

20. The method of claim 18, wherein the display unit alternates between displaying the real time image of the operator and at least one "best-fit" match in a same location.

21. The method of claim 18, wherein stored facial images are stored as key-faces.

22. The method according to 18, wherein the linked electronic data is used to search the internet for information related to the at least one "best-fit" match, and wherein related information found on the internet is displayed on the display.

23. The method according to claim 18, wherein the linked electronic data comprises an alphanumeric identifier used to search the Internet for information associated with said alphanumeric identifier.

24. The method according to 23, wherein a hyperlink to a source of the related information is displayed on the display unit.

* * * * *